(12) United States Patent
Koyama

(10) Patent No.: US 8,684,617 B2
(45) Date of Patent: Apr. 1, 2014

(54) WRITING INSTRUMENT

(75) Inventor: Takao Koyama, Fujioka (JP)

(73) Assignee: Mitsubishi Pencil Kabushiki Kaisha, Shinagawa-Ku, Tokyo (JP)

( * ) Notice: Subject to any disclaimer, the term of this patent is extended or adjusted under 35 U.S.C. 154(b) by 1177 days.

(21) Appl. No.: 10/511,304

(22) PCT Filed: May 13, 2003

(86) PCT No.: PCT/JP03/05952
§ 371 (c)(1), (2), (4) Date: Oct. 15, 2004

(87) PCT Pub. No.: WO03/095231
PCT Pub. Date: Nov. 20, 2003

(65) Prior Publication Data
US 2005/0232685 A1    Oct. 20, 2005

(30) Foreign Application Priority Data

May 14, 2002  (JP) ................................. 2002-138517
May 14, 2002  (JP) ................................. 2002-138518

(51) Int. Cl.
*B43K 5/12*   (2006.01)
(52) U.S. Cl.
USPC ......................................................... 401/192
(58) Field of Classification Search
USPC ................. 401/192, 198, 199, 201, 223, 224
See application file for complete search history.

(56) References Cited

U.S. PATENT DOCUMENTS 2,618,239 A * 11/1952 Tefft ............................. 401/217
4,065,215 A * 12/1977 Otsuka .......................... 401/199
4,979,840 A * 12/1990 Madaus et al. ................ 401/192

(Continued)

FOREIGN PATENT DOCUMENTS

DE    1 067 706 B    10/1959
DE    1 075 982 B    2/1960

(Continued)

OTHER PUBLICATIONS

English translation of International Preliminary Examination Report for PCT/JP03/05952 issued Oct. 31, 2003.

*Primary Examiner* — Tuan N Nguyen
(74) *Attorney, Agent, or Firm* — Buchanan Ingersoll & Rooney PC

(57) ABSTRACT

In a writing instrument in which an ink for a writing instrument such as a water-based ink and an oil-based ink impregnated into an ink occlusion body in a barrel is fed to a pen tip in a writing part, in order to provide a writing instrument in which a sign of exhausting the ink can readily and surely be detected, the above writing instrument is provided with a structure in which the ink impregnated into the ink occlusion body in the barrel is fed to the pen tip in the writing part, wherein the ink impregnated into the ink occlusion body described above is fed to the pen tip via an ink guiding feed having visibility, and a sign of exhausting the ink fed from the ink occlusion body is detected by visually observing the ink guiding feed described above via a visible part formed in the barrel.

18 Claims, 18 Drawing Sheets

(56) References Cited

U.S. PATENT DOCUMENTS

| | | |
|---|---|---|
| 5,013,361 A | 5/1991 | Case et al. |
| 6,224,284 B1 * | 5/2001 | Sukhna et al. ............... 401/198 |
| 6,227,741 B1 * | 5/2001 | Quercioli ..................... 401/199 |
| 6,390,711 B1 * | 5/2002 | Brunetti ....................... 401/224 |
| 6,428,235 B1 * | 8/2002 | Takanashi etal. ............ 401/192 |
| 6,659,672 B1 * | 12/2003 | Kirita ........................... 401/199 |
| 7,070,352 B2 * | 7/2006 | Iida et al. ..................... 401/192 |
| 2001/0012468 A1 | 8/2001 | Furukawa et al. |
| 2003/0072601 A1 | 4/2003 | Furukawa et al. |

FOREIGN PATENT DOCUMENTS

| | | |
|---|---|---|
| EP | 0 801 119 A1 | 10/1997 |
| EP | 1 095 791 A1 | 5/2001 |
| GB | 2114065 A | 8/1983 |
| JP | 128283/1981 | 9/1981 |
| JP | 6581/1982 | 1/1982 |
| JP | 58-138699 A | 8/1983 |
| JP | 12684/1984 | 1/1984 |
| JP | 6-270585 A | 9/1994 |
| WO | 01/43984 A1 | 6/2001 |

* cited by examiner (a)  (b)  (c)

(d)  (e)  (f)

(g)  (h)

(a)

(b)

(c)

WRITING INSTRUMENT

TECHNICAL FIELD

The present invention relates to a writing instrument in which an ink for a writing instrument such as a water-based ink and an oil-based ink impregnated into an ink occlusion body in a barrel is fed to a pen tip in a writing part, more specifically to a writing instrument which can readily detect a sign of exhausting an ink in a writing instrument having the above structure.

BACKGROUND ART

A free ink type writing instrument having a collector structure in which a liquid ink is stored directly in a barrel, a writing instrument having a structure in which an ink is stored in an ink reservoir of a cartridge type and a ballpoint pen of a type in which an ink for a ballpoint pen is filled in a transparent refill have so far been known as a writing instrument in which a remaining amount of an ink and a sign of exhausting an ink can be detected.

On the other hand, in a writing instrument in which a pen tip in a writing part is fed with an ink for a writing instrument such as a water-based ink and an oil-based ink impregnated into an ink occlusion body in a barrel, a so-called writing instrument of a sliver type, it is the existing situation that writing instruments equipped a mechanism in which a sign of exhausting an ink can be detected have not so far been available.

Accordingly, in the writing instruments having the above structures, it is not before an ink is used until starving is caused during writing that the ink is found to be exhausted, and then the writing instrument is disposed or reused with supplementing the ink. However, starving is caused as well due to drying of the pen tip, and therefore if starving is caused due to drying of the pen tip though the ink impregnated into the ink occlusion body sufficiently remains, it is not a substantial sign of exhausting the ink, and a problem on use is involved therein.

On the other hand, disclosed in Japanese Patent Application Laid-Open No. 270585/1994 is a writing instrument in which a sliver working as an ink occlusion body is mounted in a transparent barrel to feed a pen tip in a writing part with an ink impregnated in the above sliver and in which the inside of the writing instrument can be visually observed from the sliver up to the pen tip.

However, in a writing instrument having the above structure, when an amount of an ink occluded in a sliver is decreased, an remaining amount of the ink can be observed to some extent by the degree in the color of the ink occluded in the sliver, but a sign of exhausting the ink can not surely be detected. Accordingly, a problem on use is involved as well in the above writing instrument.

In light of the problems of the conventional techniques and the existing situation each described above, the present invention intends to solve them, and an object of the present invention is to provide a writing instrument in which a pen tip in a writing part is fed with an ink for a writing instrument such as a water-based ink or an oil-based ink impregnated into an ink occlusion body in a barrel, wherein a sign of exhausting the ink can readily and surely be detected, and another object thereof is to provide a writing instrument in which a consumption rate of the ink impregnated into an ink occlusion body is further improved.

DISCLOSURE OF THE INVENTION

Intensive researches repeated by the present inventors on the problems of the conventional techniques described above have resulted in finding that a writing instrument which meets the objects described above can be obtained by providing a specific structure of a barrel in a writing instrument in which an ink impregnated into an ink occlusion body in a barrel is fed to a pen tip in a writing part and a specific mechanism for feeding an ink to a pen tip from an ink occlusion body, and thus the present invention has come to be completed.

That is, the writing instrument of the present invention comprises the following items (1) to (20).

1. A writing instrument in which an ink impregnated into an ink occlusion body in a barrel is fed to a pen tip in a writing part, wherein the ink impregnated into the ink occlusion body described above is fed to the pen tip via an ink guiding feed having visibility, and a sign of exhausting the ink fed from the ink occlusion body is detected by visually observing the ink guiding feed described above via a visible part formed in the barrel.
2. A writing instrument of a twin type in which an ink impregnated into an ink occlusion body in a barrel is fed to respective pen tips in writing parts disposed at both sides of the barrel, wherein the ink fed to either of the pen tips is fed to the pen tip via an ink guiding feed having visibility, and a sign of exhausting the ink fed from the ink occlusion body is detected by visually observing the ink guiding feed described above via a visible part formed in the barrel.
3. The writing instrument as described in the above item (1) or (2), wherein the ink impregnated into the ink occlusion body is fed to the ink guiding feed having visibility via an inter-feeder.
4. The writing instrument as described in the above item (3), wherein the inter-feeder is brought into contact with the inside of the ink occlusion body in a length of 5% or more based on an overall length of the ink occlusion body.
5. The writing instrument as described in the above item (3) or (4), wherein the inter-feeder has a cross-sectional area of 1 to 90% based on a cross-sectional area of the ink occlusion body.
6. The writing instrument as described in any of the above items (3) to (5), wherein the inter-feeder has larger capillary force than that of the ink occlusion body.
7. The writing instrument as described in any of the above items (3) to (6), wherein the inter-feeder has a cross-section structure comprising an inner layer and an outer layer, and the outer layer has larger capillary force than that of the inner layer.
8. The writing instrument as described in any of the above items (3) to (7), wherein the ink fed to the ink guiding feed having visibility via the inter-feeder is further fed to the pen tip via a pen tip feeder.
9. The writing instrument as described in any of the above items (3) to (8), wherein the inter-feeder comprises any one of a fiber bundle feed, a porous sintered body of resin particles and a sliver feed, and a passage cross-sectional area for an ink flowing through the ink guiding feed can substantially be controlled by providing the inter-feeder with continuous passages while maintaining an apparent cross sectional area of the ink guiding feed.
10. The writing instrument as described in any of the above items (1) to (9), wherein a material of a face of the ink guiding feed which is brought into contact with the ink guiding feed or a material of the ink guiding feed itself has a smaller surface tension than that of the ink.

11. The writing instrument as described in any of the above items (1) to (10), wherein the ink occlusion body has a distribution in capillary force such that it is increased toward a pen tip side.
12. The writing instrument as described in any of the above items (1) to (11), wherein an inner diameter of the barrel is narrower toward the pen tip side.
13. The writing instrument as described in any of the above items (1) to (12), wherein plural ribs are formed in an axial direction on an inner wall of the pen tip side of the barrel.
14. The writing instrument as described in any of the above items (1) to (13), wherein a plurality of the ink guiding feeds having visibility is provided.
15. The writing instrument as described in any of the above items (1) to (14), wherein the ink impregnated into the ink occlusion body is fed to the pen tip through an ink-feeder in addition to the ink guiding feed having visibility.
16. The writing instrument as described in any of the above items (1) to (15), wherein a passage cross-sectional area for the ink flowing through the ink guiding feed and flow resistance of the ink can substantially be controlled by filling the ink guiding feed having visibility with a fiber bundle feed or a porous sintered body of resin particles which has a smaller surface tension than that of the ink and has a color which is different from that of the ink while maintaining an apparent cross-sectional area of the ink guiding feed.
17. The writing instrument as described in any of the above items (1) to (16), wherein the visible part in the barrel has a length of 1 mm or more and not longer than an overall length of the writing instrument.
18. The writing instrument as described in any of the above items (1) to (17), wherein the ink guiding feed has an ink passage cross-sectional area of $8 \times 10^{-2}$ to 80 mm$^2$.
19. The writing instrument as described in any of the above items (1) to (18), wherein the ink has a surface tension of 18 mN/or more at 25° C.
20. The writing instrument as described in any of the above items (1) to (19), wherein the ink has a viscosity of 500 mPa·s or less at 25° C.

BEST MODE FOR CARRYING OUT THE INVENTION

The embodiments of the present invention shall be explained below in details with reference to the drawings.

The writing instrument of the present invention comprises:
(1) a writing instrument in which an ink impregnated into an ink occlusion body in a barrel is fed to a pen tip in a writing part, wherein the ink impregnated into the ink occlusion body described above is fed to the pen tip via an ink guiding feed having visibility, and a sign of exhausting the ink fed from the ink occlusion body is detected by visually observing the ink guiding feed described above via a visible part formed in a barrel (for example, FIG. 1 to FIG. 9),
(2) a writing instrument of a twin type in which an ink impregnated into an ink occlusion body in a barrel is fed to respective pen tips in writing parts disposed at both sides of the barrel, wherein the ink fed to either of the pen tips is fed to the pen tip via an ink guiding feed having visibility, and a sign of exhausting the ink fed from the ink occlusion body is detected by visually observing the ink guiding feed described above via a visible part formed in the barrel (for example, FIG. 10) and (3) and (4) the writing instruments as described in the above item (1) or (2), wherein the ink impregnated into the ink occlusion body is fed to the ink guiding feed having visibility via an inter-feeder (for example, FIG. 11 to FIG. 18).

Figure 1:
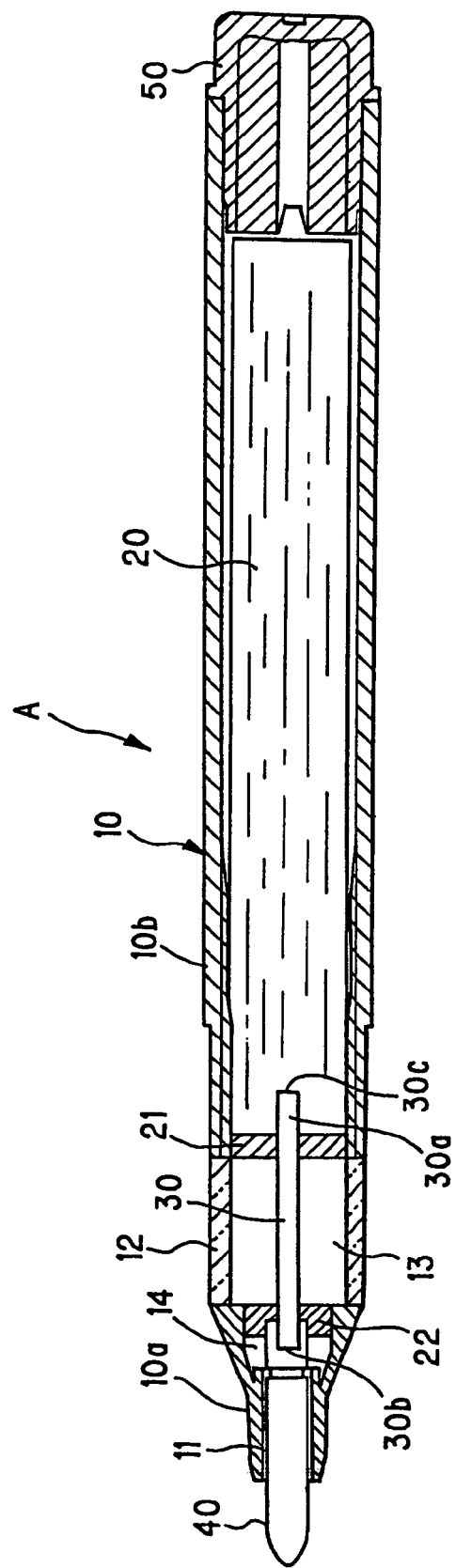
FIG. 1 is a longitudinal cross section of a writing instrument showing the first embodiment of the present invention.
Figure 2:
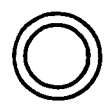
FIG. 2(a) to (h) are cross sections showing the respective forms of an ink guiding feed 30.
Figure 2:
Figure 2:
Figure 2:
Figure 2:
Figure 2:
Figure 2:
Figure 2:
Figure 3:
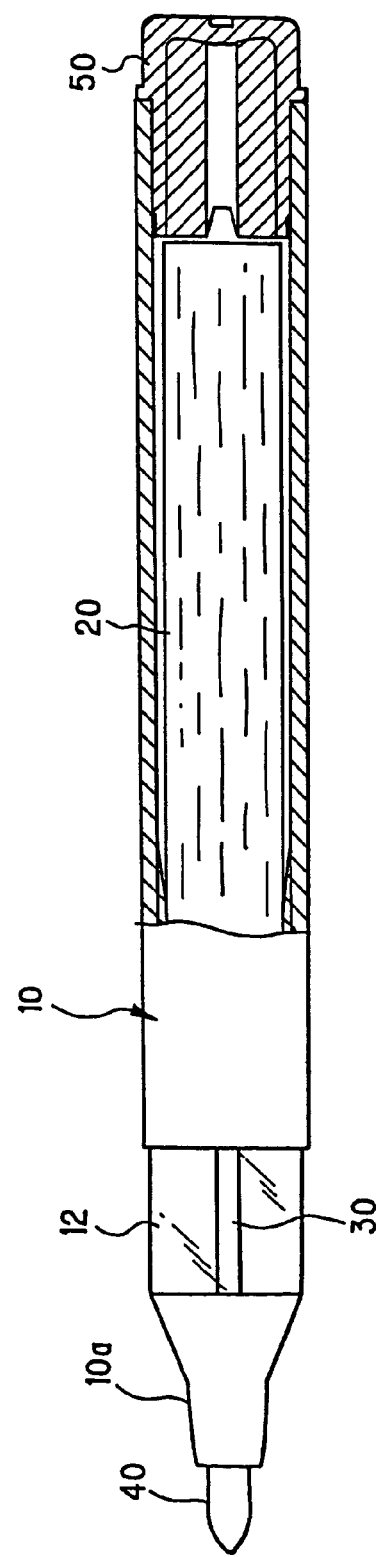
FIG. 3 is a partial longitudinal cross section of the writing instrument showing the first embodiment of the present invention.

FIG. 1 to FIG. 3 show the first embodiment of the present invention, and it can suitably be applied to a felt-tip pen, a marker and a marker for a white board.

As shown in FIG. 1 and FIG. 3, the writing instrument A of the first embodiment is equipped with a barrel 10 which is a writing instrument main body, an ink occlusion body 20, an ink guiding feed 30, a pen tip 40 and plug 50.

The barrel 10 is constituted of, for example, a synthetic resin, and a small diameter part 10a having a taper part at a tip side and a large diameter part 10b are integrated. Adopted is a structure in which an fitting part 11 into which a pen tip 40 is fitted is present in the small diameter part 10a and in which the ink occlusion body 20 impregnated with an ink for a writing instrument and the ink guiding feed 30 are mounted in the inside of the large diameter part 10b.

As shown in FIG. 1 and FIG. 3, the tip side of the large diameter part 10b in the barrel 10 has a visible part 12 constituted of a transparent material or a translucent material so that the inside of the barrel can visually be observed, and the other parts are non-visible parts constituted of different materials.

The whole part of the barrel 10 may be constituted of a transparent material or a translucent material having visibility so that the whole part of the barrel 10 can visually be observed. Further, the whole part of the barrel 10 may be constituted of a transparent material or a translucent material having visibility, and the other parts than the visible part 12 may be non-visible parts in the form of a colored part and a decorated part.

An overall length of the above visible part 12 may be such a length that the ink guiding feed 30 held in the barrel 10 can visually be observed through the visible part 12, and it is preferably 1 mm or more and not longer than an overall length of the writing instrument main body (barrel in the present embodiment), more preferably 5 mm or more. If an overall length of the above visible part 12 is less than 1 mm, a sign of exhausting the ink is less liable to be visually detected, and the detection function can not be attained.

The ink occlusion body 20 is impregnated with an ink for a writing instrument such as a water-based ink and an oil-based ink, and it comprises, for example, a fiber bundle comprising a single one or a combination of two or more of a natural fiber, an animal hair fiber, a polyacetal base resin, an acryl base resin, a polyester base resin, a polyamide base resin, a polyurethane base resin, a polyolefin base resin, a polyvinyl base resin, a polycarbonate base resin, a polyether base resin and a polyphenylene base resin, a matter obtained by processing a fiber bundle such as a felt, and a porous body such as a sponge, a sintered body of resin particles and a sintered matter. The ink occlusion body 20 is mounted between a rear holder 21 sealing a front part of the barrel 10 and the plug 50 in the barrel.

As shown in FIG. 1, the ink guiding feed 30 is a cylindrical (tubular) ink passage member having visibility and constituted of, for example, a transparent material or a translucent material made of a resin, a rubber or glass. To be specific, the transparent or translucent resin includes polyolefin base resins such as polypropylene, polyethylene, cyclic polyolefin and poly(1-methyl-4-pentene), polycarbonate polystyrene, polyethylene terephthalate, polyethylene naphthalate, polybutylene terephthalate and fluorinated plastics such as a fluororesin and polyvinylidene fluoride. Further, the transparent or translucent rubber includes fluorinated rubber and silicone rubber. In the present embodiment, the ink guiding feed is constituted of polypropylene.

Further, in the transparent material or translucent material made of a resin, a rubber or glass described above, at least a face which is brought into contact with an ink may be subjected to surface treatment so that a surface energy of the face is reduced smaller than that of the ink. To be specific, it includes fluorine coating, fluororesin coating or coating treatment with a silicone resin comprising a skeleton of dimethylsilicone.

A rear end part 30a of the above ink guiding feed 30 passes through the rear holder 21 and is inserted into the ink occlusion body 20, and a front end part 30b passes through a front holder 22 sealing the inside of the small diameter part 10a in the barrel 10 and is inserted into a rear end part of the pen tip 40. This allows a visible space part 13 to be formed in the barrel 10, and the ink guiding feed 30 is held in a central part of the above visible space part 13 by the rear holder 21 sealing the inside of the barrel 10 and the front holder 22. An air flow groove in which air can flow is formed on an inner wall face in the small diameter part 10a and the front part of the large diameter part 10b in the barrel 10 from an atmospheric side of the pen tip 40 to the front part of the barrel 10 in which the ink occlusion body 20 is mounted, and air can flow from an atmospheric side of the pen tip 40 to the inside of the barrel 10 as is the case with a conventional writing instrument of a sliver type.

The above structure makes it easy to visually observe the ink guiding feed 30 via the visible part 12 in the barrel 10. The ink impregnated into the ink occlusion body 20 flows in the ink guiding feed 30 by virtue of capillary force and is fed to the pen tip 40 via the above ink guiding feed 30.

An overall length of the above ink guiding feed 30 is suitably determined depending on the kind of the pen tip 40, and since usually a length from a front end of the ink occlusion body 20 up to the pen tip 40 is determined by capillary force thereof, the overall length of the ink guiding feed is determined to be a length reaching the above length. An ink passage cross-sectional area of the ink guiding feed 30 is preferably $8 \times 10^{-2}$ to 80 mm$^2$, more preferably 0.5 to 20 mm$^2$ in order to allow the ink to more smoothly flow in it.

If the above ink passage cross-sectional area is less than $8 \times 10^{-2}$ mm$^2$, the ink flow amount is decreased, and the ink followability in writing is inferior. On the other hand, if it exceeds 80 mm$^2$, the ink guiding feed 30 can not be long, and it is difficult to visually detect a sign of exhausting the ink. If the ink guiding feed 30 is long in the case of a cross-sectional area exceeding 80 mm$^2$, it is easy to visually detect a sign of exhausting the ink. In this case, however, an excess amount of the ink discharges from the pen tip in writing with the pen tip turning downward.

Further, in order to feed smoothly the ink from the ink occlusion body 20 up to the pen tip 40, a surface tension of a face of the ink guiding feed 30 brought into contact with the ink or the material itself of the ink guiding feed 30 is preferably smaller than that of the ink. When a surface tension of the face of the ink guiding feed 30 brought into contact with the ink is larger than that of the ink, a surface tension of the face of the ink guiding feed 30 brought into contact with the ink can be smaller than a surface tension of the ink by subjecting the face of the ink guiding feed to fluorine treatment or silicon treatment.

Further, as shown in FIG. 2(a) to (h), cross-sectional patterns of the ink guiding feed 30 include, for example, a circle form [FIG. 2(a)], polygonal forms such as a triangular form [FIG. 2(b)], a quadrangular form [FIG. 2(c)], a pentagonal form [FIG. 2(d)], a hexagonal form [FIG. 2(e)] and a rhombic form [FIG. 2(g)], an elliptic form [FIG. 2(f)] and a star form [FIG. 2(h)]. It shall not specifically be restricted as long as the ink is smoothly fed from the ink occlusion body 20 up to the pen tip 40 and the visibility is not obstructed. The ink guiding feed 30 of the present embodiment has a circular cross-sectional form.

The pen tip 40 comprises, for example, a parallel fiber bundle comprising a single one or a combination of two or more of a natural fiber, an animal hair fiber, a polyacetal base resin, an acryl base resin, a polyester base resin, a polyamide base resin, a polyurethane base resin, a polyolefin base resin, a polyvinyl base resin, a polycarbonate base resin, a polyether base resin and a polyphenylene base resin, a fiber feed obtained by processing a fiber bundle such as a felt or obtained by processing the above fiber bundles with a resin or a pen tip comprising a porous body obtained by fusing various plastic powders. Various forms are selected as a form thereof depending on a form of the writing instrument, for example, a marking pen, a felt-tip pen and the like.

The ink impregnated into the ink occlusion body 20 described above shall not specifically be restricted as long as it is an ink for a writing instrument such as a water-based ink and an oil-based ink having the respective blend compositions which are usually used, and it includes water-based ink and oil-based inks for a felt-tip pen, a marking pen, a ballpoint pen and a marker for a white board depending on uses. A surface tension of the ink is controlled preferably to 18 mN/m or more, more preferably to 20 to 50 mN/m at 25° C. in order to detect well a sign of exhausting the ink in the ink guiding feed 30. A surface tension of the ink can be controlled by blending, if necessary, the ink with a surfactant.

Further, a viscosity of the ink is controlled preferably to 500 mPa·s or less, more preferably 200 mPa·s or less and particularly preferably 1 to 100 mPa·s at 25° C. in order to smoothly feed the ink to the ink occlusion body 20, the ink guiding feed 30 and the pen tip 40. If the above viscosity of the ink exceeds 500 mPa·s, the ink is deteriorated in fluidity and does not discharge in a sufficiently large amount, so that starving of the drawn lines and incapability of quick writing due to a shortage in the discharge amount are brought about in a certain case. A viscosity of the ink can be controlled by blending, if necessary, the ink with a thickener.

In the writing instrument A of the present first embodiment which is constituted in the manner described above, the ink impregnated in the ink occlusion body 20 passes through the ink guiding feed 30 and penetrates into the pen tip 40 by virtue of a capillary phenomenon, as shown in FIG. 1 and FIG. 3, whereby writing becomes possible.

The above writing instrument A of the first embodiment has a structure in which the ink impregnated into the ink occlusion body 20 always passes through the ink guiding feed 30 and is fed to the pen tip 40, and therefore when the ink impregnated into the ink occlusion body 20 is decreased and exhausted by writing, that can be found by the absence of the ink passing through the ink guiding feed 30.

That is, in the writing instrument A of the present embodiment, a sign of exhausting the ink fed from the ink occlusion body 20 can be detected by visually observing the ink guiding feed 30 via the visible part 12 formed in the barrel 10. Accordingly, it can clearly and easily be judged from visual observation whether or not starving at the pen tip 40 is caused by drying at the pen tip 40 or substantial exhaustion of the ink due to consumption.

In the present embodiment, the plug 50 is fixed at the rear end part in the barrel 10, however a mechanism in which the plug 50 can detachably be mounted at the rear end part of the barrel 10 is adopted and, the plug 50 is detached to replenish the ink after detecting exhaustion of the ink by visually observing the ink guiding feed 30, whereby the writing instrument can be reused. Further, in order to prevent the ink from being fed excessively from the ink guiding feed 30 to the pen tip 40 and leaking from the pen tip 40 when the above writing instrument A is used under the environment of a high temperature, an ink absorber may be provided in the periphery of the rear end part of the pen tip 40. The above ink absorber is disposed at a space 14 formed in the periphery of the rear end part of the pen tip 40 in the small diameter part 10a.

Further, in the present embodiment, the end faces of the ink occlusion body 20 are closed against the outside air by the plug 50 and the front holder 22 which closes the end face of the ink occlusion body 20 at the side where the ink guiding feed 30 and the ink occlusion body 20 are joined, and therefore the outside air does not flow in, so that the air can be prevented from flowing into the ink guiding feed 30.

Figure 4:
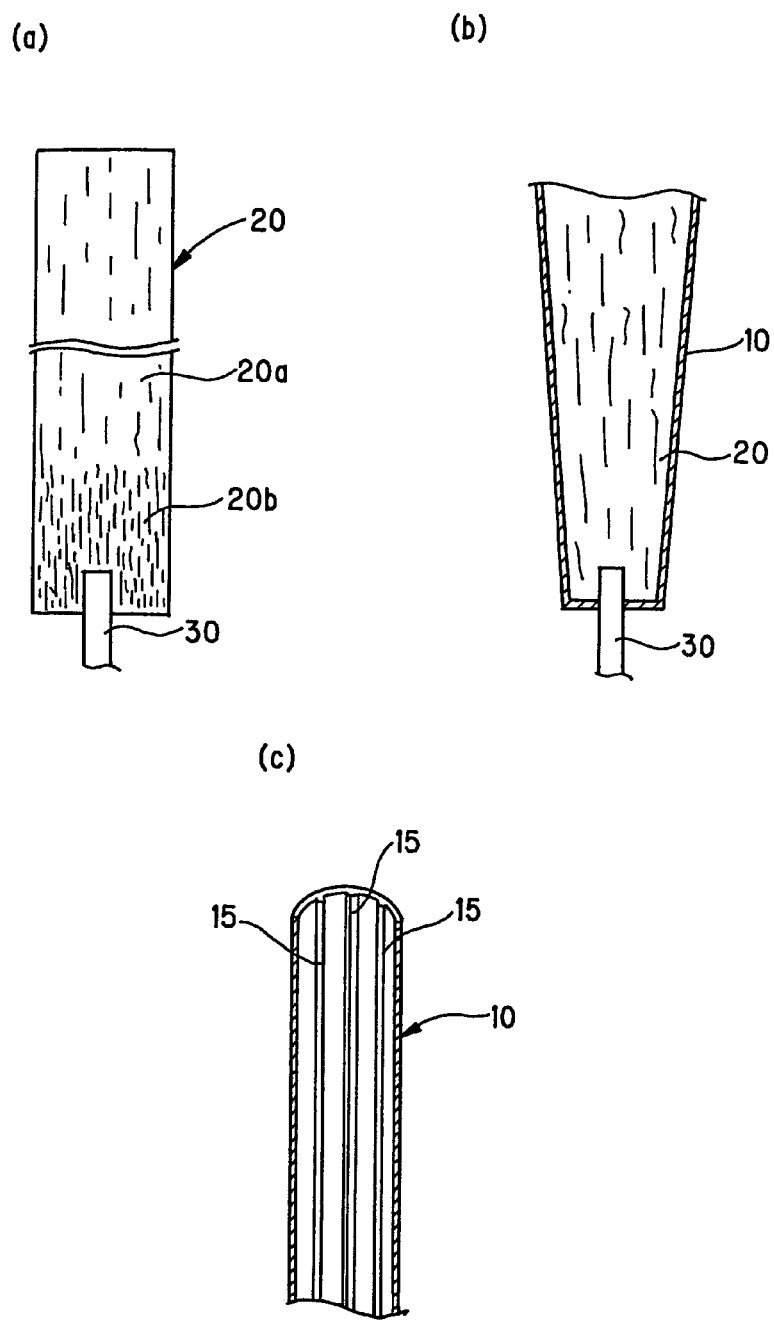
FIG. 4(a) is a partial longitudinal cross section showing a variant example of an ink occlusion body 20; (b) is a partial longitudinal cross section showing a variant example of a barrel 10 and the ink occlusion body 20; and (c) is a partial longitudinal cross section showing a variant example of the barrel 10.

FIGS. 4 (a) to (c) are variant examples of the first embodiment described above. FIG. 4 (a) is a form in which capillary force of the ink occlusion body is increased toward a pen tip side, for example, a structure in which a space between the fiber bundles constituting the ink occlusion body 20 is narrower toward the pen tip side, that is, the ink occlusion body is constituted of a coarse part 20a and a fine part 20b.

FIG. 4(b) is of a structure in which an inner diameter of the barrel 10 is narrower toward the pen tip side (tapering form), and the ink occlusion body 20 is as well of a structure in which it is narrower toward the pen tip side. FIG. 4(c) is of a structure in which plural ribs 15, 15—are formed in an axial direction on an inner wall part in the barrel 10 mounting the ink occlusion body 20.

The ink impregnated into the ink occlusion body 20 flows well into the ink guiding feed 30 and is fed well to the pen tip 40 by employing the respective structures of FIG. 4(a) to (c) or a combination thereof in the writing instrument A of the first embodiment described above.

FIGS. 5(a) and (b) show the second embodiment of the present invention. The writing instrument B of the present second embodiment is different from the writing instrument A of the first embodiment described above only in the point that provided are plural ink guiding feeds 31, 32 having visibility, to the specific, two ink guiding feeds 31, 32 which are constituted of a transparent member or a translucent member and which have different lengths. In FIGS. 5(a) and (b), the explanation of the same structure as in the first embodiment described above shall be omitted by affixing the same reference numerals.

In the present second embodiment, rear end parts 31a, 32a of both the ink guiding feed 31 having a long overall length and the ink guiding feed 32 having a short overall length are inserted, as shown in FIG. 5(b), into the inside of an ink occlusion body 20 with a difference X in length passing through a rear holder 21, and front end parts 31b, 32b are inserted into a rear end part of a pen tip 40 with the end parts thereof being arranged respectively to the same level passing through a front holder 22 sealing a small diameter part 10a in a barrel 10. This allows the ink guiding feeds 31, 32 to be held in the central part of the above visible space part 13.

In the above writing instrument B of the present second embodiment, the ink impregnated in the ink occlusion body 20 passes through the ink guiding feeds 31, 32 and is fed to the pen tip 40 as is the case with the first embodiment described above, whereby writing becomes possible. Further, in the above writing instrument B, the respective end parts 31a, 32a are inserted into the ink occlusion body 20 with a difference X in length. Thus, the ink impregnated into the ink occlusion body 20 at the maximum rate is gradually consumed by writing, and when the ink stops flowing through the long ink guiding feed 31, it is detected via the visible part 12 that, for example, about 90% of the ink remains in the ink occlusion body 20. Then, the ink is consumed more by further writing, and when the ink stops flowing through the short ink guiding feed 32, it can be detected via the visible part 12 that the ink is exhausted from the ink occlusion body 20.

Accordingly, in the writing instrument B of the present second embodiment, the respective end parts 31a, 32a of the ink guiding feeds inserted into the ink occlusion body 20 are disposed with a difference in length, whereby an amount of the ink remaining in the ink occlusion body 20 and a sign of exhausting the ink can be detected by visually observing the ink guiding feeds 31, 32 described above via the visible part 12 formed in the barrel 10.

In the second embodiment described above, the ink guiding feeds 31, 32 each having a different length are used, but the ink guiding feeds having the same length may be used. In this case, the ink can further smoothly be fed to the pen tip 40.

In the second embodiment described above, the number of the ink guiding feeds is set to two feeds, but three or more ink guiding feeds each having a different length or the same length may suitably be disposed depending on the uses of the writing instrument.

Further, the variant examples shown in FIG. 4(a) to (c) may be applied to the writing instrument B of the second embodiment described above (the same shall apply to the following embodiments).

FIGS. 6(a) and (b) show the third embodiment of the present invention. The writing instrument C of the present third embodiment is different from the writing instrument A of the first embodiment described above only in the point that an ink impregnated in an ink occlusion body 20 is fed to a pen tip 40 via an ink feeder 34 in addition to an ink guiding feed 33 having visibility. In FIGS. 6(a) and (b), the explanation of the same structure as in the first embodiment described above shall be omitted by affixing the same reference numerals.

In the present third embodiment, both the ink guiding feed 33 and the ink feeder 34 are inserted, as shown in FIG. 6(b), into the ink occlusion body 20 passing through a rear holder 21, and both front end parts thereof are inserted respectively into a rear end part of the pen tip 40 with the end parts thereof being arranged to the same level passing through a front holder 22 sealing a small diameter part 10a in a barrel 10. This allows the ink guiding feed 33 and the ink feeder 34 to be held in the central part of the above visible space part.

In the writing instrument C of the above present second embodiment, the ink impregnated into the ink occlusion body 20 passes through the ink guiding feed 33 having visibility which is constituted in the same manner as in the first embodiment described above and the ink feeder 34 comprising a fiber bundle and the like and is fed to the pen tip 40, whereby writing becomes possible. In the above writing instrument C, the ink can be fed to the pen tip 40 via the ink feeder 34 in addition to the ink guiding feed 33, and therefore the ink can further smoothly be fed to the pen tip 40. In order to surely detect a sign of exhausting the ink by visually observing the ink guiding feed 33 via a visible part 12, ink-feeding force of the ink feeder 34 to the pen tip is set preferably weaker than ink-feeding force of the ink guiding feed 33.

FIG. 7(a) to (c) show the fourth embodiment of the present invention. The writing instrument D of the present fourth embodiment is different from the writing instrument A of the first embodiment described above only in the point that an ink guiding feed 35 is filled with a fiber bundle or a porous sintered body of resin particles which has a smaller surface tension than that of an ink impregnated into an ink occlusion body 20 and has a different color from that of the ink, for example, a fiber bundle or a porous sintered body of resin particles 36 comprising polyethylene tetrafluoride [FIG. 7(b)] or a fiber bundle or a porous sintered body of resin particles 37 comprising polyvinylidene fluoride [FIG. 7(c)], whereby a passage cross-sectional area for the ink flowing through the ink guiding feed 35 and flow resistance of the ink can substantially be controlled while maintaining an apparent cross-sectional area of the ink guiding feed 35. In FIGS. 7(a) and (b), the explanation of the same structure as in the first embodiment described above shall be omitted by affixing the same reference numerals. Preferably used is the foregoing fiber bundle or porous sintered body of resin particles in which a material itself has a lower surface energy than that of the ink or in which a surface energy is reduced to a lower level than that of the ink by subjecting to surface treatment.

The fiber bundle or porous sintered body of resin particles 36 or 37 of the present fourth embodiment has preferably a different color from that of the ink impregnated into the ink occlusion body 20, more preferably a color which is masked by the color of the ink used. For example, it is white when the ink is black, blue when the ink is red and black when the ink is yellow, and it may be transparent or translucent but does not necessarily have to be colored.

In the writing instrument D of the present fourth embodiment, the ink impregnated into the ink occlusion body 20 passes through the ink guiding feed 35 having visibility into which the bar-like fiber bundle or porous sintered body of resin particles 36 or 37 is inserted without bringing into contact with an inner wall of the ink guiding feed 35, and it is fed to the pen tip 40, whereby writing becomes possible. In the above writing instrument D, the fiber bundle or porous sintered body of resin particles 36 or 37 which has a smaller surface tension than that of the ink and has a different color from that of the ink is inserted into the inside of the ink guiding feed 35 without bringing into contact with an inner wall of the ink guiding feed 35, that is, a space in which the ink can flow is secured, whereby a passage cross-sectional area for the ink flowing through the ink guiding feed 35 can be reduced to thereby substantially reduce the cross-sectional area while maintaining an apparent cross-sectional area of the ink guiding feed. Thus, a volume of the ink flowing through the ink guiding feed 35 can be reduced as well, and therefore a function of detecting a sign of exhausting the ink and a problem of ink excess discharge at that time can be solved at the same time.

Further, in the writing instrument D of the present fourth embodiment, when the ink is exhausted (run out), the color of the fiber bundle or porous sintered body of resin particles 36 or 37 having a different color from that of the ink can be visually observed from the ink feed 35, and therefore a sign of exhausting the ink can more surely be visually observed, which is different from that a sign of exhausting the ink in the writing instruments of the first to third embodiments is detected by visually observing exhaustion of the ink in the ink guiding feed.

Figure 8:
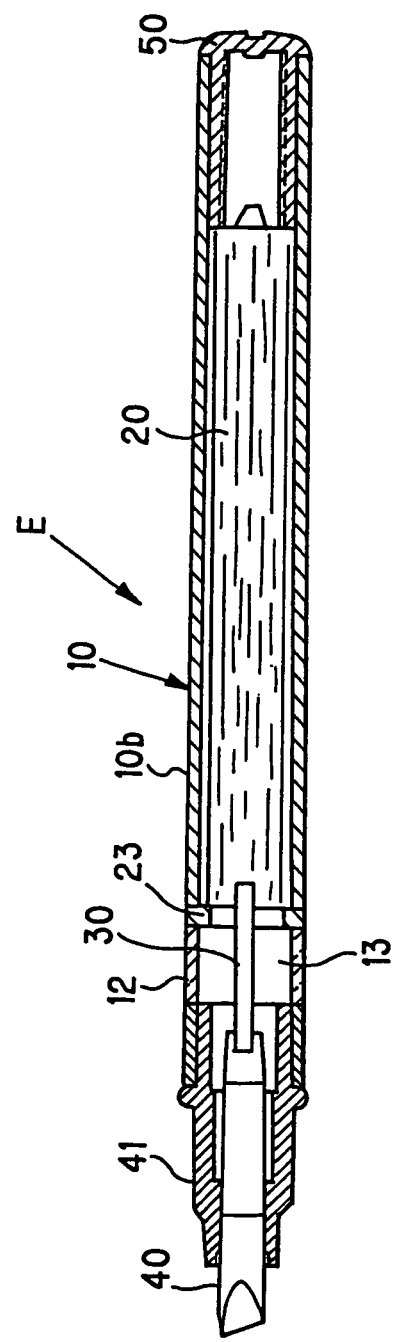
FIG. 8 is a partial longitudinal cross section of a writing instrument showing the fifth embodiment of the present invention.

FIG. 8 shows the fifth embodiment of the present invention. The writing instrument E of the present fifth embodiment is different from the writing instrument A of the first embodiment described above in the point that a pen tip 40 is for underline, the point that a front barrel 41 for holding the pen tip comprises a different member and is fixed at a front end of a barrel 10, the point that a rear holder 21 and a front holder 22 are omitted and the point that a holding stage 23 for holding an ink occlusion body 20 is provided peripherally in place of the rear holder 21. Feeding of the ink and a sign of exhausting the ink are detected by visually observing an ink guiding feed via a visible part 12 as is the case with the writing instrument A.

Figure 9:
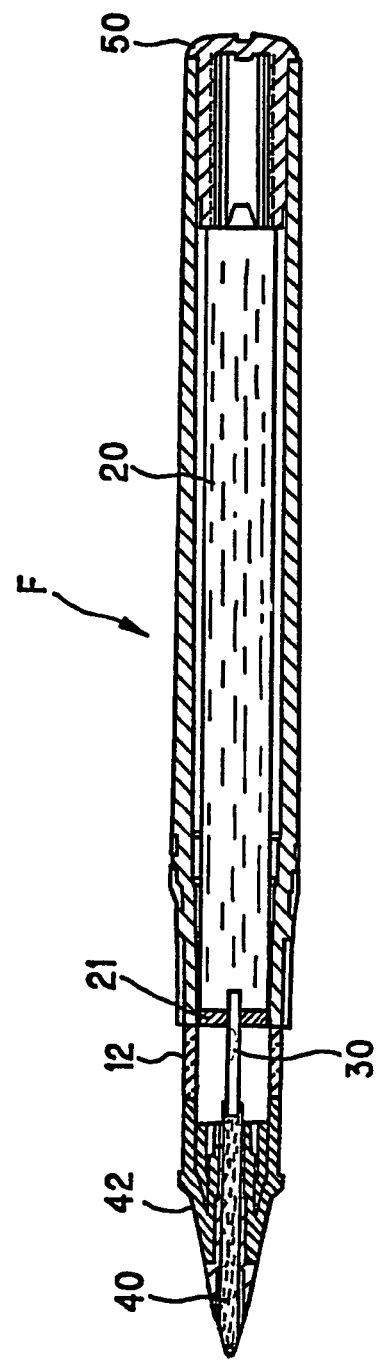
FIG. 9 is a partial longitudinal cross section of a writing instrument showing the sixth embodiment of the present invention.

FIG. 9 shows the sixth embodiment of the present invention. The writing instrument F of the present sixth embodiment is different from the writing instrument A of the first embodiment described above in the point that a pen tip 40 is for a ballpoint pen equipped with an ink guiding feed, the point that a front barrel 42 for holding the pen tip comprises a different member and is fixed at a front end of a barrel 10 and the point that a front holder 22 is omitted. Feeding of the ink and a sign of exhausting the ink are detected by visually observing an ink guiding feed 30 via a visible part 12 as is the case with the writing instrument A.

Figure 10:
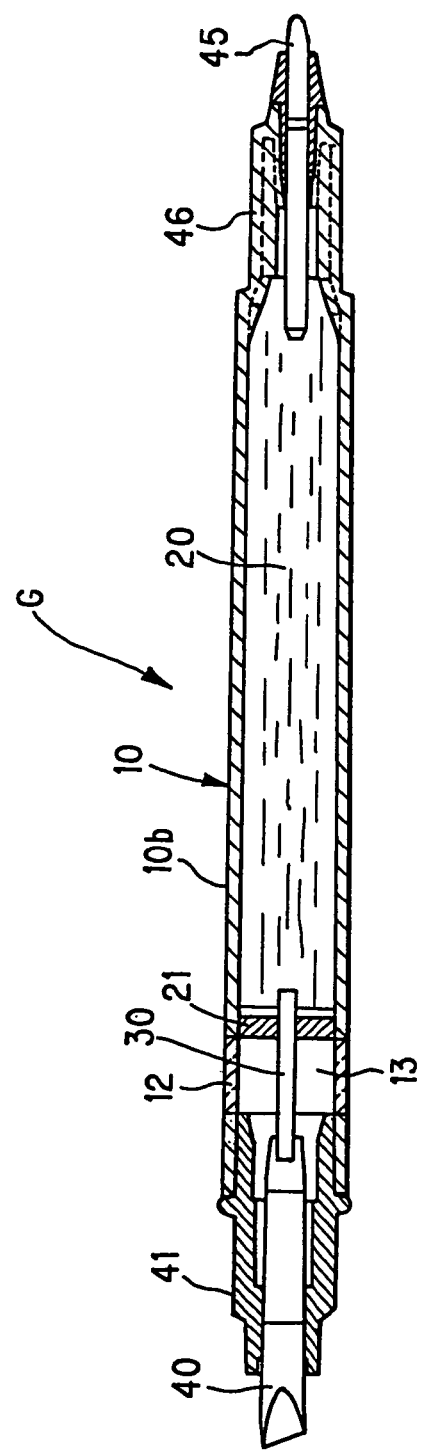
FIG. 10 is a partial longitudinal cross section of a writing instrument of a twin type showing the seventh embodiment of the present invention.

FIG. 10 shows the seventh embodiment of the present invention, and it is a writing instrument G of a twin type in which an ink impregnated into an ink occlusion body 20 in a barrel 10 is fed to a pen tip 40 for underline and a pen tip 45 for a felt-tip pen which are writing parts provided at both sides of the barrel 10.

The ink is fed from the ink occlusion body 20 via an ink guiding feed 30 having visibility at a pen tip 40 side as is the case with the fifth embodiment shown in FIG. 8, and at a pen tip 45 side, a rear end part of the pen tip 45 is inserted into the ink occlusion body 20 and brought into contact therewith, whereby the ink is fed directly from the ink occlusion body 20. The reference numeral 46 shows a front barrel part molded integrally with the barrel 10. Further, air can flow into the barrel 10 from an atmospheric side of the pen tip 45 as well through an air flow groove formed on an inner wall of the front barrel part 46 as is the case with a conventional writing instrument of a sliver type.

In the above writing instrument G of a twin type, the ink is consumed at the respective pen tips 40, 45, and as is the case with the fifth embodiment, a sign of exhausting the ink in the ink occlusion body 20 is detected by visually observing an ink guiding feed 30 via a visible part 12.

The visible part 12, the ink guiding feed 30 and the like are provided at a pen tip 40 side in the embodiment described above. On the contrary, it is allowed that the visible part 12, the ink guiding feed 30 and the like are provided at a pen tip 45 side and that a rear end part of the pen tip 40 is inserted into and brought into contact with the ink occlusion body 20, whereby the ink is fed directly from the ink occlusion body 20.

FIG. 11 to FIG. 18 show respective embodiments having a structure in which an ink impregnated into an ink occlusion body 20 is fed to an ink guiding feed 30 having visibility via an inter-feeder 25 in the writing instruments A to G of the respective embodiments shown in FIG. 1 to FIG. 10. In the writing instruments of the respective embodiments shown in FIG. 11 to FIG. 18, the explanation of the same structures as in the writing instruments A to G of the first to seventh embodiments described above shall be omitted by affixing the same reference numerals.

Figure 11:
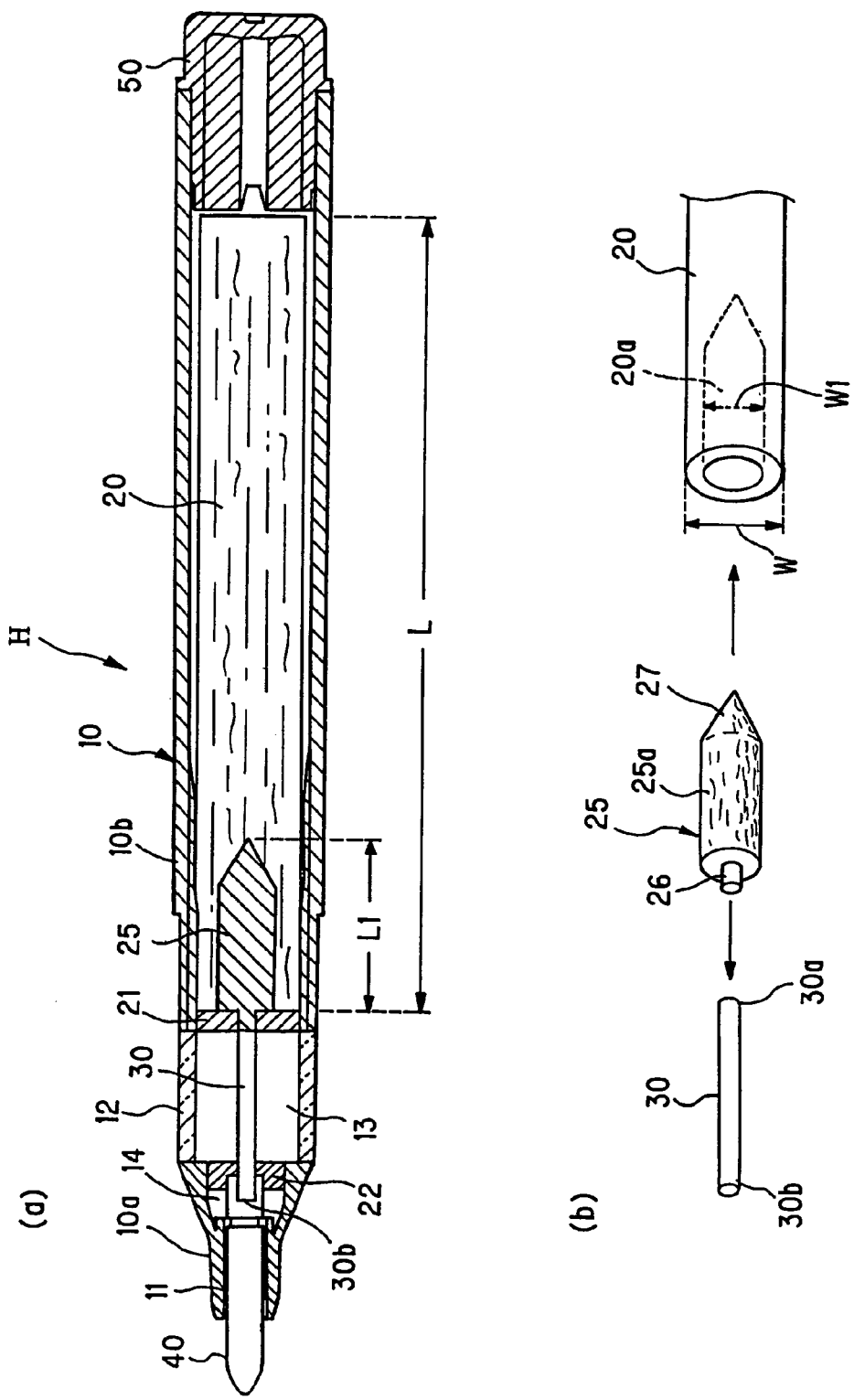
FIG. 11(a) is a partial longitudinal cross section of a writing instrument showing the eighth embodiment of the present invention, and (b) is a partial longitudinal cross section showing an essential part thereof, that is, a connecting state between an ink guiding feed, an inter-feeder and an ink occlusion body.

FIG. 11 shows the eighth embodiment of the present invention. The writing instrument H of the above eighth embodiment has a structure in which an ink impregnated into an ink occlusion body 20 is fed to an ink guiding feed 30 having visibility via an inter-feeder 25 in the writing instrument A of the first embodiment shown in FIG. 1 to 3.

The inter-feeder 25 comprises, as is the case with the ink occlusion body 20, a fiber bundle, a fiber bundle feed obtained by processing a fiber bundle such as felt, a hard sponge, a porous sintered body of resin particles comprising resin particle-sintered matter or a sliver feed each having continuous pores (passages), and a form and a structure thereof shall not specifically be restricted as long as the ink impregnated into the ink occlusion body 20 can be fed to the ink guiding feed 30 having visibility via the inter-feeder 25. It includes, for example, a structure in which as shown in FIG. 11(a) and (b), the inter-feeder 25 has at a front end part, an inserting part 26 which is inserted into a rear end part 30a of the ink guiding feed 30 and has an acute angle part 27 having an acute angular form at a rear end part thereof. Further, a cavity part 20a which can bring into contact with an outer face of the inter-feeder 25 described above is provided at a front end side of the ink occlusion body 20. The ink impregnated into the ink occlusion body 20 can more efficiently be fed to the ink guiding feed 30 having visibility via the inter-feeder 25 owing to the structure of the inter-feeder 25 having the inserting part 26 and the acute angle part 27 and the ink occlusion body 20 having the cavity part 20a each shown in FIGS. 11(a) and (b).

Further, the ink impregnated into the ink occlusion body 20 can efficiently be fed to the ink guiding feed 30 by making capillary force of the inter-feeder 25 larger than capillary force of the ink occlusion body 20, providing the inter-feeder 25 with a cross-sectional structure having an inner layer part and an outer layer part and making capillary force of the outer layer part larger than capillary force of the inner layer part, for example, making a density of the fiber bundle in the outer layer fine and making a density of the fiber bundle in the inner layer coarse.

In the above case, the inter-feeder 25 is brought into contact with the ink occlusion body 20 in a length of 5% or more, preferably 10% or more and 100% or less based on an overall length (L) of the ink occlusion body 20, that is, a length $L_1$ of the inter-feeder 25 brought into contact with the ink occlusion body 20 is 5% or more, preferably 10% or more based on an overall length L of the ink occlusion body 20, and the inter-feeder 25 is brought into contact with the ink occlusion body 20 in a length of more preferably 20% or more and 100% or less, particularly preferably 50% or more and 100% or less. This makes it possible to more efficiently feed the ink contained in the ink occlusion body 20 to the ink guiding feed 30. A length $L_1$ of the inter-feeder 25 shown in FIGS. 11(a) and (b) is set to 20% based on an overall length L of the ink occlusion body 20. If the length brought into contact with the ink occlusion body 20 is less than 5%, the ink consumption rate is reduced to the same level of a conventional writing instrument of a sliver type in a certain case.

Further, a cross-sectional area $W_1$ of the inter-feeder 25 is 1 to 90%, preferably 5 to 50% and more preferably 10 to 25% based on a cross-sectional area W of the ink occlusion body 20.

If a cross-sectional area $W_1$ of the above an inter-feeder 25 is less than 1%, an amount of the ink fed from the ink occlusion body 20 is short, though depending on the form of the pen tip 40, and brought about are the problems that the drawn lines cause starving and that the followability to quick writing is inferior. On the other hand, if it exceeds 90%, not only the inter-feeder 25 is less liable to be inserted into the ink occlusion body 20, but also the function of the ink occlusion body 20 decreases, and the writing instrument can not be distinguished from a conventional writing instrument of a sliver type which merely replaces the whole occlusion body 20 with the inter-feeder 25.

A cross-sectional area $W_1$ of the inter-feeder 25 is set to 1 to 90% based on a cross-sectional area W of the ink occlusion body 20, whereby the ink impregnated into the ink occlusion body 20 can efficiently be fed to the ink guiding feed 30. A cross-sectional area $W_1$ of the inter-feeder 25 shown in FIGS. 11(*a*) and (*b*) is set to 60% based on a cross-sectional area W of the ink occlusion body 20.

In the writing instrument H of the present eighth embodiment constituted in the manner described above, the ink impregnated into the ink occlusion body 20 passes through, as shown in FIG. 11, the ink guiding feed 30 via the inter-feeder 25 and penetrates into the pen tip 40 to make writing possible. In the present embodiment, the ink impregnated into the ink occlusion body 20 is not introduced directly into the ink guiding feed by virtue of capillary force, and it is introduced into the ink guiding feed 30 via the inter-feeder 25, so that the ink impregnated into the ink occlusion body 20 is introduced efficiently and smoothly into the ink guiding feed 30.

In the above writing instrument H of the eighth embodiment, employed is a structure in which the ink impregnated into the ink occlusion body 20 usually passes through the ink guiding feed 30 via the inter-feeder 25 and is fed to the pen tip 40, and therefore when the ink impregnated into the ink occlusion body 20 is decreased and exhausted by writing, that can be found by the absence of the ink passing through the ink guiding feed 30.

That is, in the writing instrument H of the present embodiment, a sign of exhausting the ink fed from the ink occlusion body 20 can be detected by visually observing the ink guiding feed 30 described above via the visible part 12 formed in the barrel 10. Accordingly, it can clearly and easily be judged from visual observation whether or not starving at the pen tip 40 is caused by drying at the pen tip 40 or substantial exhaustion of the ink due to consumption.

In the writing instrument H of the present eighth embodiment described above, the inter-feeder 25 comprises any one of a fiber bundle feed, a porous sintered body of resin particles and a sliver feed, and the above an inter-feeder 25 is provided with continuous passages, whereby a passage cross-sectional area for the ink flowing through the ink guiding feed 30 can substantially be controlled while maintaining an apparent cross-sectional area of the ink guiding feed. That is, controlling of the ink passage cross-sectional area makes the ink contained in the ink guiding feed 30 less liable to move due to passage resistance when impact is exerted by falling of the writing instrument to make it possible to inhibit the ink from dropping from a pen tip 40. Further, controlling of the ink passage cross-sectional area makes it possible to suppress the ink discharge amount after detecting exhaustion of the ink to inhibit inferior writing caused by excess flowing of the ink.

Figure 12:
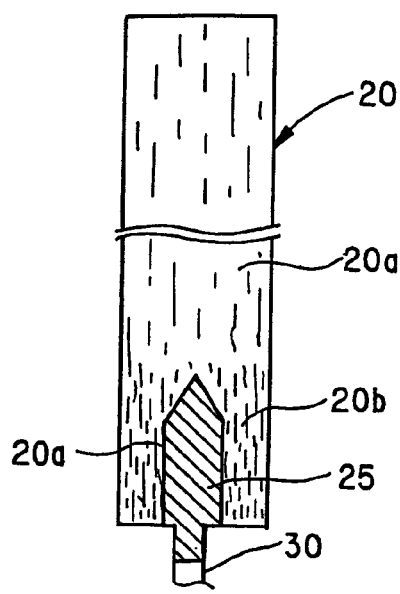
FIG. 12(a) is a partial longitudinal cross section showing a variant example of an ink occlusion body 20 having an inter-feeder 25; (b) is a partial longitudinal cross section showing a variant example of the barrel 10 and the ink occlusion body 20 having the inter-feeder 25; and (c) is a partial longitudinal cross section showing a variant example of the barrel 10.
Figure 12:
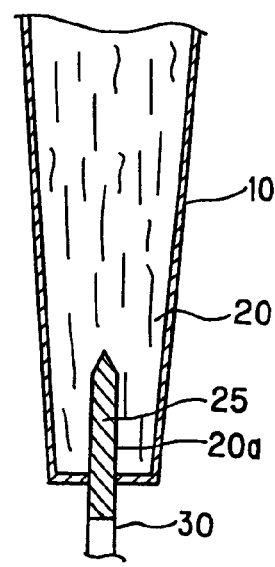
Figure 12:
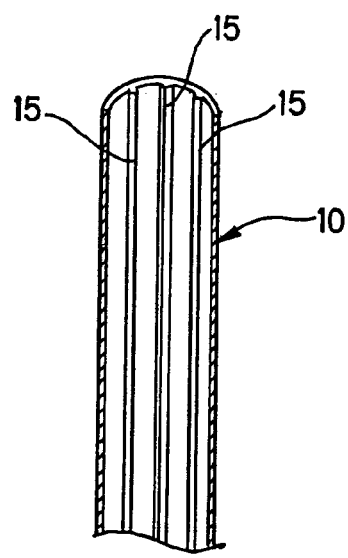

FIG. 12(*a*) to (*c*) are variant examples of the eighth embodiment described above. FIG. 12(*a*) has a form in which capillary force of the ink occlusion body is increased more toward a pen tip side, for example, a structure in which a space between the fiber bundles constituting the ink occlusion body 20 is narrower toward the pen tip side, that is, the occlusion body is constituted from a coarse part 20*a* and a fine part 20*b*.

FIG. 12(*b*) is of a structure in which an inner diameter of the barrel 10 is narrower toward the pen tip side (tapering form), and the ink occlusion body 20 is as well of a structure in which it is narrower toward the pen tip side. A width (diameter) of the inter-feeder 25 is approximately the same as an inner diameter of the ink guiding feed 30.

FIG. 12(*c*) is of a structure in which plural ribs 15, 15—are formed in an axial direction on the inner wall of the barrel 10 mounting the ink occlusion body 20.

The ink impregnated into the ink occlusion body 20 flows well into the ink guiding feed 30 via the inter-feeder 25 and is fed well to the pen tip 40 by employing the above respective structures of FIG. 12(*a*) to (*c*) or a combination thereof to the writing instrument H of the eighth embodiment described above.

Figure 13:
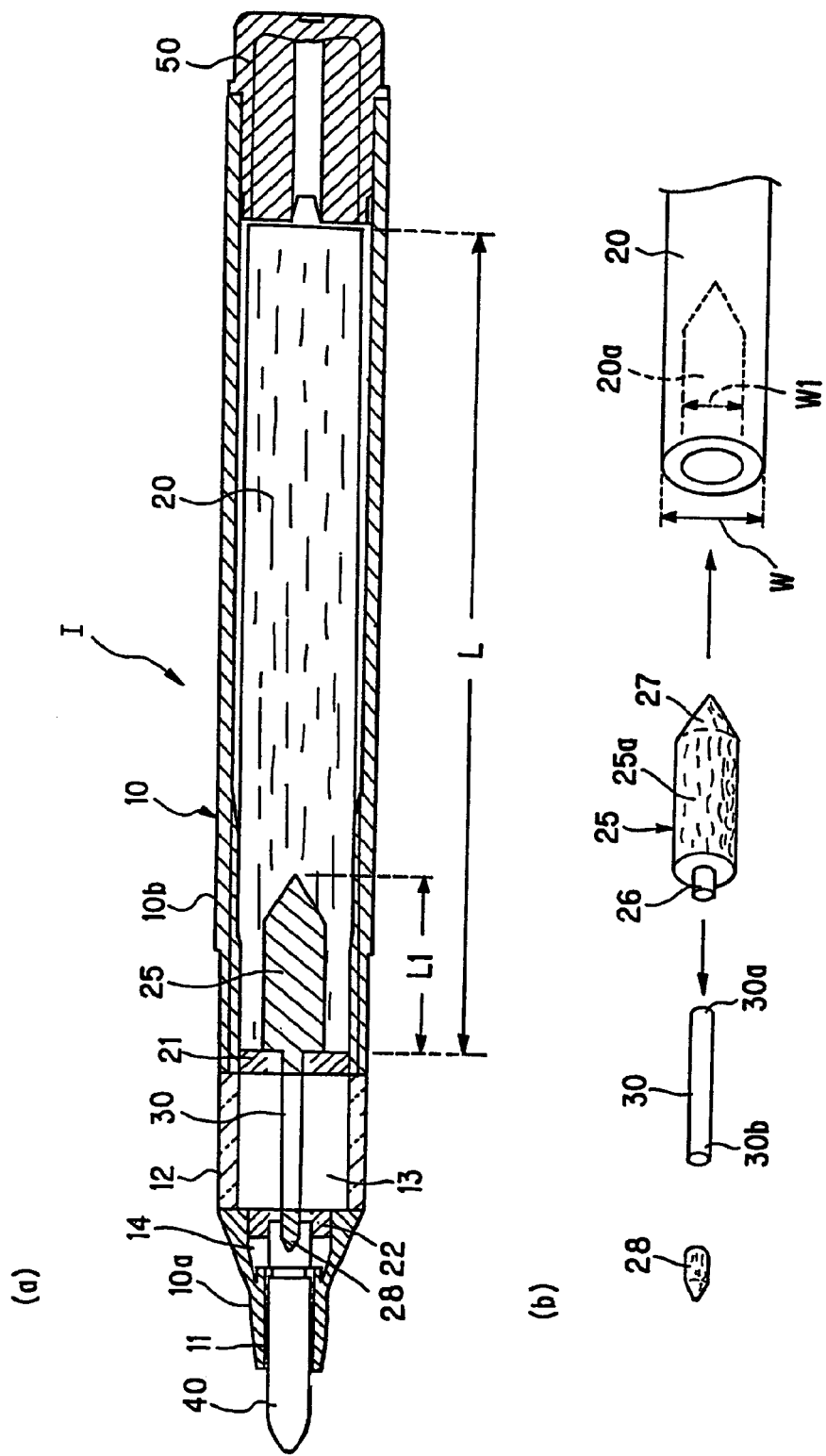
FIG. 13(a) is a partial longitudinal cross section of a writing instrument showing the ninth embodiment of the present invention, and (b) is a partial longitudinal cross section showing an essential part thereof.

FIGS. 13 (*a*) and (*b*) show the ninth embodiment of the present invention. The writing instrument I of the present ninth embodiment is different from the writing instrument H of the eighth embodiment described above only in the point that it is of a structure in which an ink fed to an ink guiding feed 30 having visibility from an inter-feeder 25 is fed to a pen tip 40 via a pen tip feeder 28 inserted into a front end part 30*b* of the ink guiding feed 30.

In the writing instrument I of the present ninth embodiment, the ink impregnated into the ink occlusion body 20 passes through the ink guiding feed 30 via the inter-feeder 25 and is smoothly fed to the pen tip 40 via the pen tip feeder 28 as is the case with the eighth embodiment described above, whereby writing becomes possible. In the above writing instrument I, a sign of exhausting the ink contained in the ink occlusion body 20 can be detected by visually observing the ink guiding feed 30 described above via a visible part 12 formed in a barrel 10.

In the embodiment described above, the pen tip feeder 28 is separately provided, and it may be of a structure in which the pen tip 40 is integrated with the pen tip feeder 28, that is, an integrated structure in which a rear end part of the pen tip 40 is the pen tip feeder 28.

Further, variant examples shown in FIG. 12(*a*) to (*c*) may be applied to the writing instrument I of the ninth embodiment described above (the same shall apply to the following embodiments).

Figure 5:
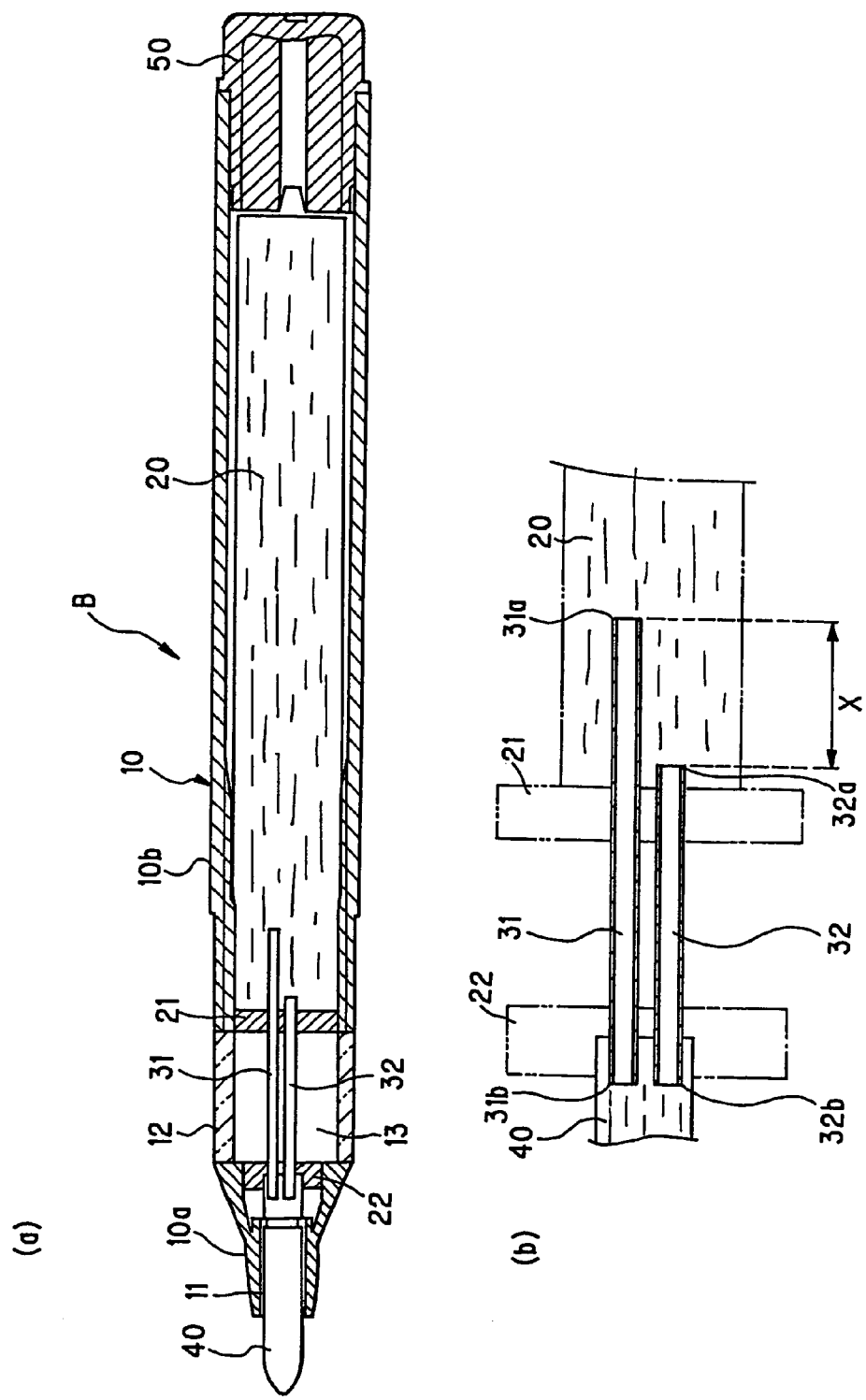
FIG. 5(a) is a partial longitudinal cross section of a writing instrument showing the second embodiment of the present invention, and (b) is a partial longitudinal cross section showing an essential part thereof.
Figure 14:
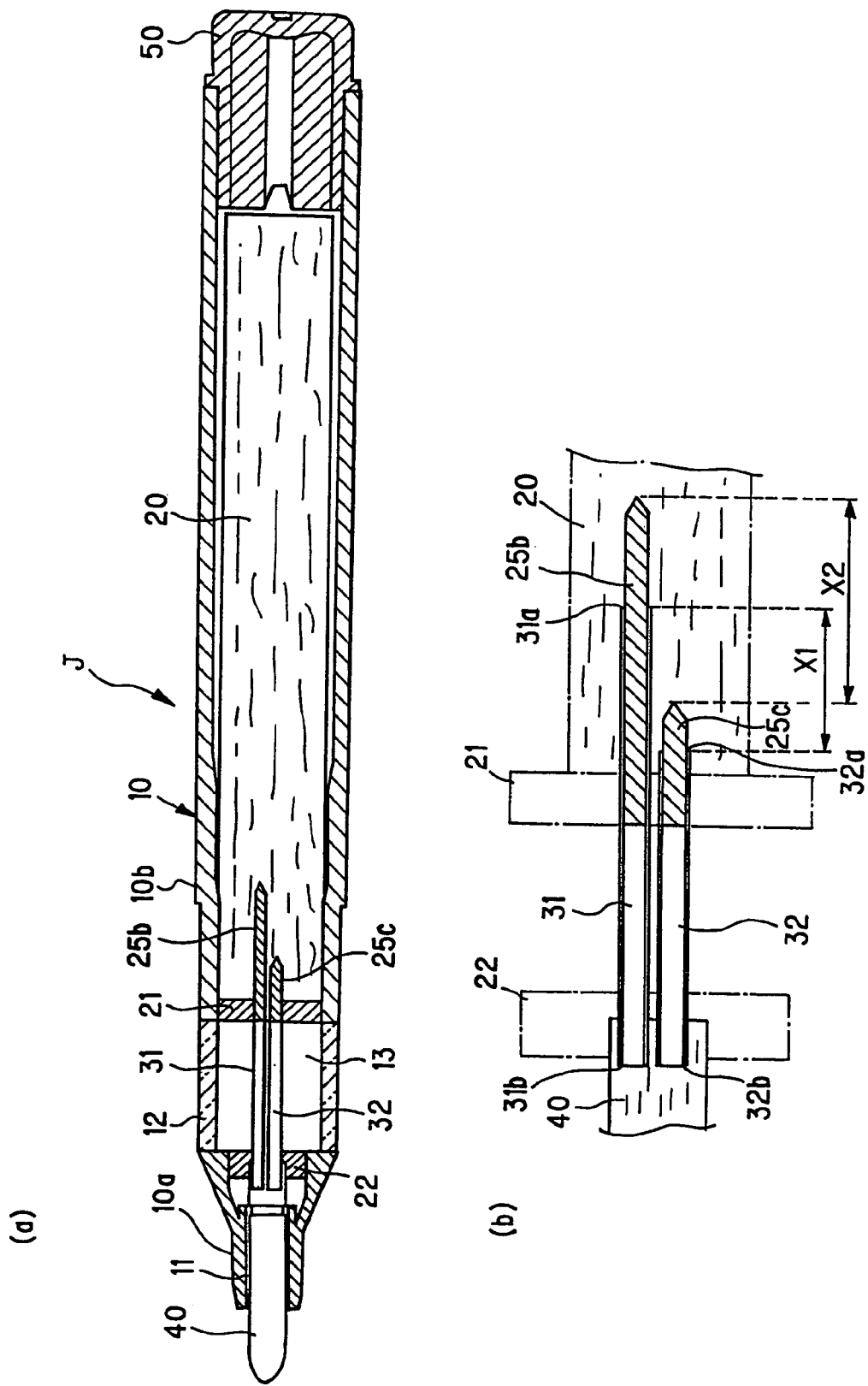
FIG. 14(a) is a partial longitudinal cross section of a writing instrument showing the tenth embodiment of the present invention, and (b) is a partial longitudinal cross section showing an essential part thereof.

FIGS. 14(*a*) and (*b*) show the tenth embodiment of the present invention, and the writing instrument J of the above tenth embodiment has a structure in which the writing instrument B of the second embodiment shown in FIG. 5 is provided with inter-feeders 25*b*, 25*c*.

The writing instrument J of the present tenth embodiment is different from the writing instrument H of the eighth embodiment described above only in the point that provided are plural ink guiding feeds 31, 32 having visibility, to be specific two ink guiding feeds 31, 32 which are constituted of transparent members or translucent members having different lengths, the point that an ink impregnated into an ink occlusion body 20 is fed to the ink guiding feeds 31, 32 having visibility via respective inter-feeders 25*b*, 25*c* having different lengths and the point that the widths (diameters) of the inter-feeders 25*b*, 25*c* are controlled to approximately the same as the respective inner diameters of the ink guiding feeds 31, 32.

In the writing instrument J of the present tenth embodiment, rear end parts 31*a*, 32*a* of both the ink guiding feed 31 having a long overall length and the ink guiding feed 32 having a short overall length are inserted, as shown in FIG. 14(*b*), into the inside of the ink occlusion body 20 with a difference $X_1$ in length passing through a rear holder 21, and front end parts 31*b*, 32*b* are inserted into a rear end part of the pen tip 40 with the end parts thereof being arranged to the same level passing through a front holder 22 sealing a small diameter part 10*a* in a barrel 10. This allows the ink guiding feeds 31, 32 to be held in the central part of the above visible space part 13.

In the writing instrument J of the above present tenth embodiment, the ink impregnated into the ink occlusion body 20 passes through the ink guiding feeds 31, 32 via the inter-feeders 25b, 25c and is fed to the pen tip 40 as is the case with the eighth embodiment described above, whereby writing becomes possible. Further, in the above writing instrument J, the respective end parts 31a, 32a of the ink guiding feeds are inserted into the ink occlusion body 20 with a difference $X_1$ in length, and the respective end parts of the inter-feeders 25b, 25c are inserted into the ink occlusion body 20 with a difference $X_2$ in length. Accordingly, the ink impregnated into the ink occlusion body at the maximum rate is gradually consumed by writing, and when the ink stops flowing through the long ink guiding feed 31 via the inter-feeder 25b, it is detected via the visible part 12 that, for example, about 80% of the ink remains in the ink occlusion body 20. Then, the ink is consumed by further writing, and when the ink stops flowing through the short ink guiding feed 32 via the inter-feeder 25c, it can be detected via the visible part 12 that the ink is exhausted from the ink occlusion body 20.

Accordingly, in the writing instrument J of the present tenth embodiment, the respective end parts 31a, 32a of the ink guiding feeds are disposed with a difference of $X_1$ in length, and the respective end parts of the inter-feeders 25b, 25c are disposed with a difference of $X_2$ in length, whereby an amount of the ink remaining in the ink occlusion body 20 and a sign of exhausting the ink can be detected by visually observing the ink guiding feeds 31, 32 described above via the visible part 12 formed in the barrel 10.

In the tenth embodiment described above, the ink guiding feeds 31, 32 each having a different length are used, but if the ink guiding feeds having the same length and the inter-feeders 25b, 25c each having a different length are used, a remaining amount of the ink and a sign of exhaustion can be detected in the same manner described above.

In the tenth embodiment described above, the number of the ink guiding feeds has been set to two feeds, but three or more ink guiding feeds each having different lengths or the same length may suitably be disposed depending on the uses of the writing instrument.

Figure 7:
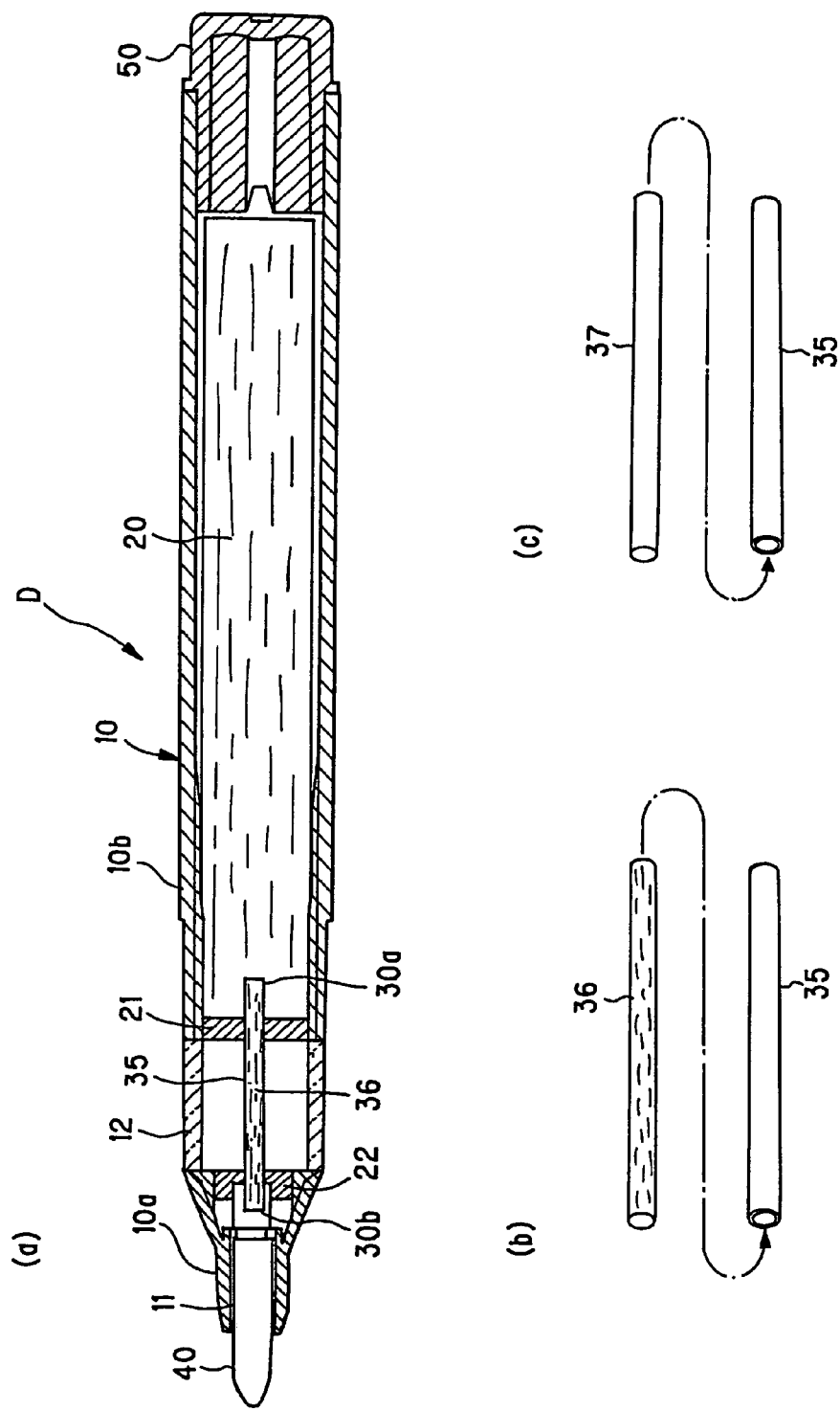
FIG. 7(a) is a partial longitudinal cross section of a writing instrument showing the fourth embodiment of the present invention; (b) is a perspective view showing an ink guiding feed thereof; and (c) is a perspective view of the ink guiding feed showing another embodiment.

FIG. 15(a) to (c) show the eleventh embodiment of the present invention, and the writing instrument K of the above eleventh embodiment is of a structure in which the writing instrument D of the fourth embodiment shown in FIG. 7 is provided with an inter-feeder 25d.

Figure 15:
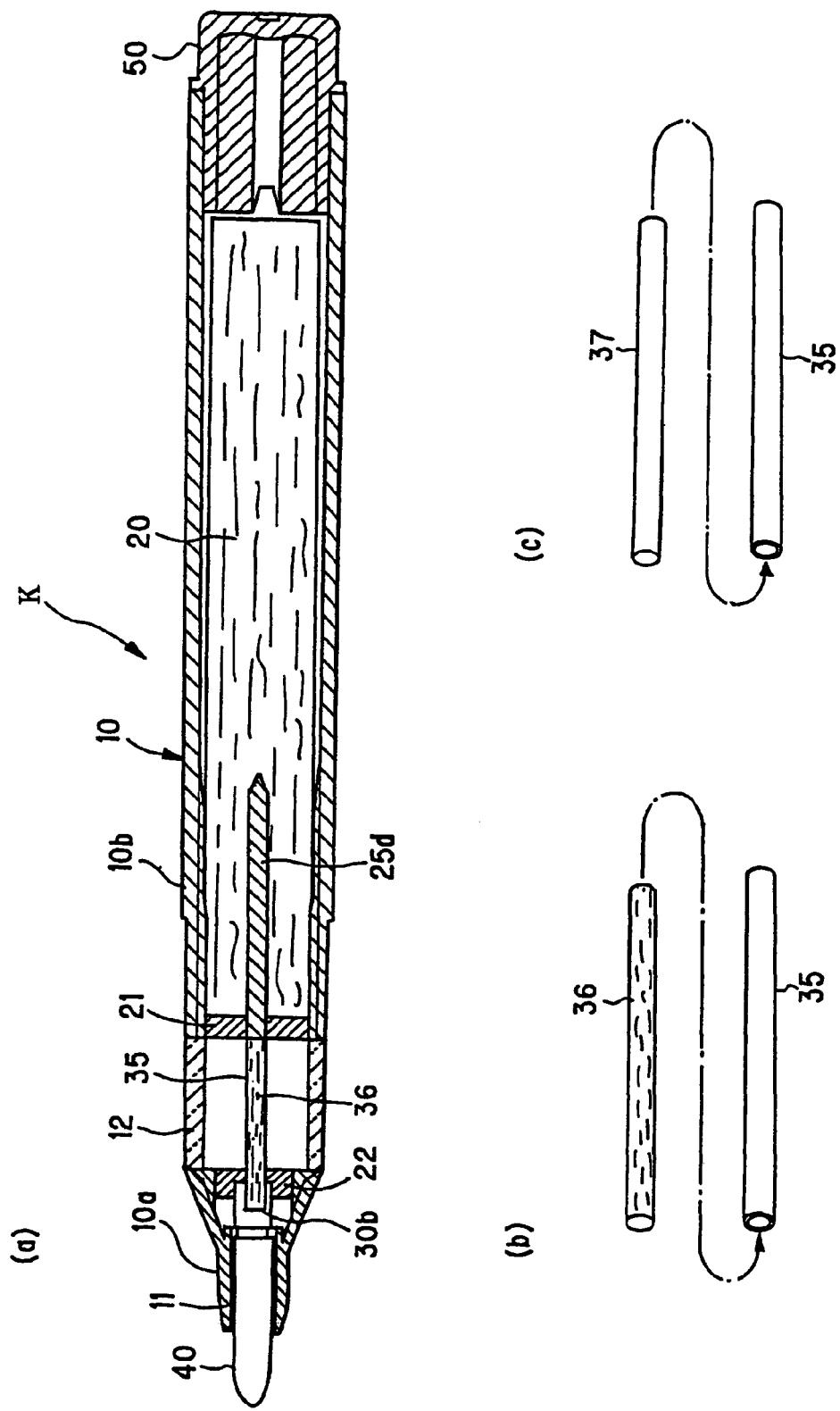
FIG. 15(a) is a partial longitudinal cross section of a writing instrument showing the eleventh embodiment of the present invention; (b) is a perspective view showing an ink guiding feed thereof; and (c) is a perspective view of the ink guiding feed showing another embodiment.

The writing instrument K of the present eleventh embodiment is different from the writing instrument H of the eighth embodiment described above only in the point that an ink guiding feed 35 is filled with a fiber bundle or a porous sintered body of resin particles which has a smaller surface tension than that of an ink impregnated into an ink occlusion body 20 and has a different color from that of the ink, for example, a fiber bundle or a porous sintered body of resin particles 36 comprising polyethylene tetrafluoride [FIG. 15 (b)] or a fiber bundle or a porous sintered body of resin particles 37 comprising polyvinylidene fluoride [FIG. 15 (c)], whereby a passage cross-sectional area for the ink flowing through the ink guiding feed and flow resistance of the ink are substantially controlled while maintaining an apparent cross-sectional area of the ink guiding feed 35. Since an inserted part of an inter-feeder 25 is inserted into a rear end part of the ink guiding feed 35, a length of the fiber bundle or the porous sintered body of resin particles 36 or 37 is shorter than a length of the ink guiding feed 35.

Preferably used is the foregoing fiber bundle or porous sintered body of resin particles the material itself of which has a lower surface energy than that of the ink or in which a surface energy is reduced to a lower level than that of the ink by subjecting to surface treatment.

The fiber bundle or porous sintered body of resin particles 36 or 37 of the present eleventh embodiment has preferably a different color from that of the ink impregnated into the ink occlusion body 20, more preferably a color which is masked by the color of the ink used. For example, it is white when the ink is black, blue when the ink is red and black when the ink is yellow, and it may be transparent or translucent but does not necessarily have to be colored.

In the writing instrument K of the present eleventh embodiment, the ink impregnated into the ink occlusion body 20 passes, via the inter-feeder 25d, through the ink guiding feed 35 having visibility into which the bar-like fiber bundle or porous sintered body of resin particles 36 or 37 is inserted without bringing into contact with an inner wall of the ink guiding feed 35, and it is fed to the pen tip 40, whereby writing becomes possible. In the above writing instrument K, the fiber bundle or porous sintered body of resin particles 36 or 37 which has a smaller surface tension than that of the ink and has a different color from that of the ink is provided in the inside of the ink guiding feed 35 without bringing into contact with an inner wall of the ink guiding feed 35, whereby a passage cross-sectional area for the ink flowing through the ink guiding feed 35 can be reduced to thereby substantially reduce the cross-sectional area of the ink guiding feed while maintaining an apparent cross-sectional area. Thus, a volume of the ink flowing through the ink guiding feed 35 can be reduced as well, and therefore a function of detecting a sign of exhausting the ink and a problem of ink excess discharge at that time can be solved at the same time.

Further, in the writing instrument K of the present eleventh embodiment, when the ink is exhausted (run out), the color of the fiber bundle or porous sintered body of resin particles 36 or 37 which has a different color from that of the ink can be visually observed from the ink guiding feed 35, and therefore a sign of exhausting the ink can more clearly be observed, which is different from that a sign of exhausting the ink in the writing instruments of the eighth to tenth embodiments is detected by visually observing the exhaustion of the ink in the ink guiding feed.

Figure 16:
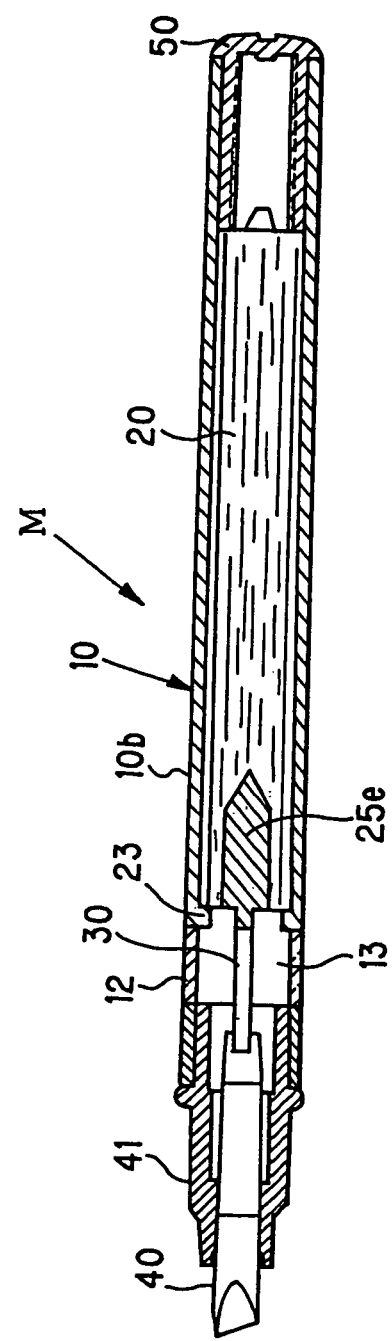
FIG. 16 is a partial longitudinal cross section of a writing instrument showing the twelfth embodiment of the present invention.

FIG. 16 shows the twelfth embodiment of the present invention, and the writing instrument M of the above twelfth embodiment is of a structure in which the writing instrument E of the fifth embodiment shown in FIG. 8 is provided with an inter-feeder 25e.

The writing instrument M of the present twelfth embodiment is different from the writing instrument H of the eighth embodiment described above in the point that a pen tip 40 is for a highlighter, the point that a front barrel 41 for holding the pen tip comprises a different member and is fixed at a front end of a barrel 10, the point that the rear holder 21 and the front holder 22 are omitted, the point that a holding stage part 23 is provided peripherally in place of the front holder 22 and the point that the inter-feeder 25e has a different form and size. Feeding of the ink and a sign of exhausting the ink are detected by visually observing an ink guiding feed 30 via a visible part 12 as is the case with the writing instruments A and H.

Figure 17:
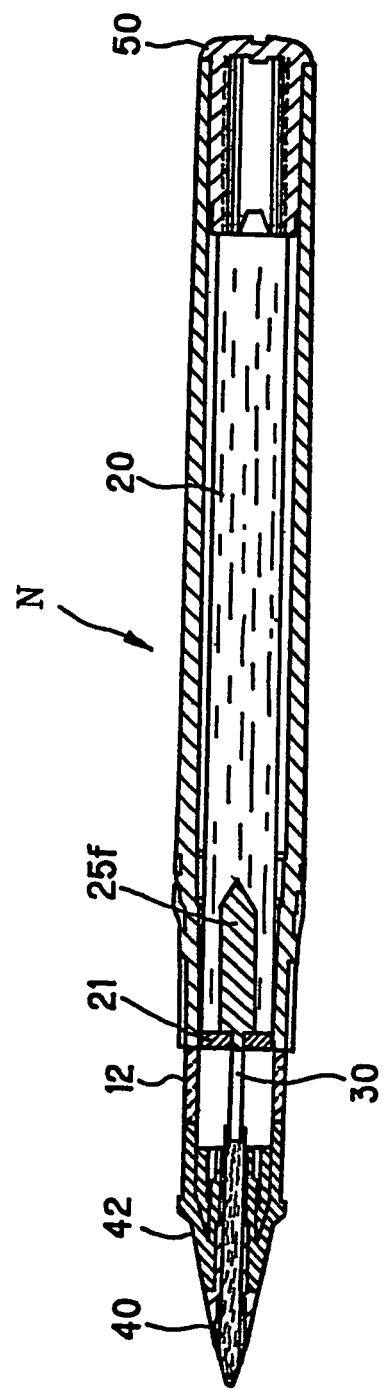
FIG. 17 is a partial longitudinal cross section of a writing instrument showing the thirteenth embodiment of the present invention.

FIG. 17 shows the thirteenth embodiment of the present invention, and the writing instrument N of the above thirteenth embodiment is of a structure in which the writing instrument F of the sixth embodiment shown in FIG. 9 is provided with an inter-feeder 25f.

The writing instrument N of the present thirteenth embodiment is different from the writing instrument H of the eighth embodiment described above in the point that a pen tip is for a ballpoint pen equipped with an ink guiding feed, the point that a front barrel 42 for holding the pen tip comprises a different member and is fixed at a front end of a barrel 10, the point that the front holder 22 is omitted and the point that the inter-feeder 25*f* has a different form and size. Feeding of the ink and a sign of exhausting the ink are detected by visually observing an ink guiding feed 30 via a visible part 12 as is the case with the writing instruments A and H.

Figure 18:
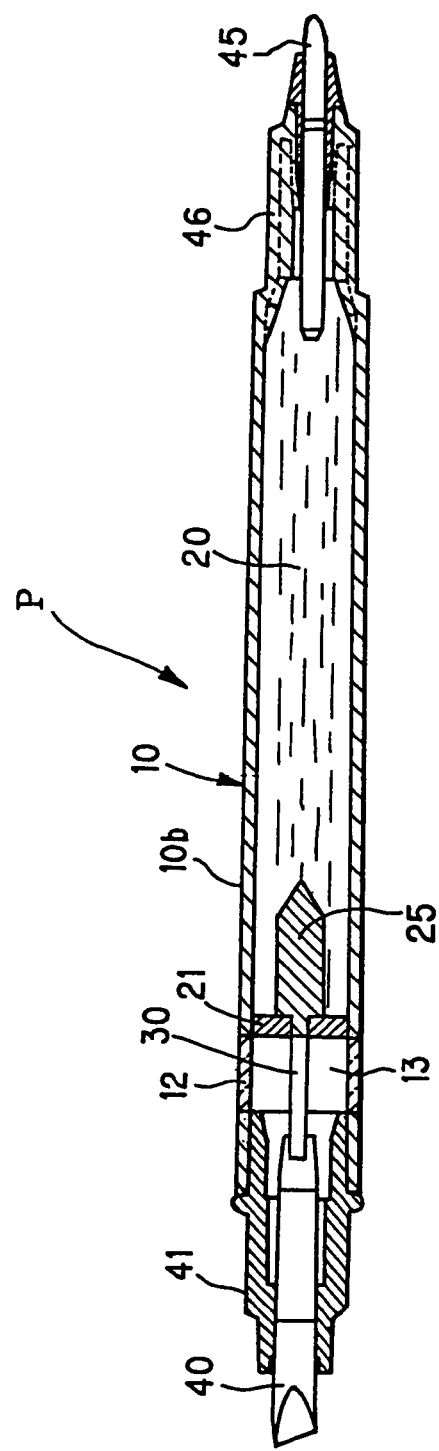
FIG. 18 is a partial longitudinal cross section of a writing instrument showing the fourteenth embodiment of the present invention.

FIG. 18 shows the fourteenth embodiment of the present invention, and the writing instrument P of the above fourteenth embodiment is of a structure in which the writing instrument G of the seventh embodiment shown in FIG. 10 is provided with an inter-feeder 25*g*. The above writing instrument is a writing instrument of a twin type in which an ink impregnated into an ink occlusion body 20 in a barrel 10 is fed to a pen tip 40 for underline and a pen tip 45 for a felt-tip pen which are writing parts provided at both sides of the barrel 10.

The ink is fed smoothly and efficiently from the ink occlusion body 20 via an ink guiding feed 30 having visibility and the inter-feeder 25 at a pen tip 40 side, and at a pen tip 45 side, a rear end part of the pen tip 45 is inserted into the ink occlusion body 20 and brought into contact therewith, whereby the ink is fed directly from the ink occlusion body 20. The reference numeral 46 shows a front barrel part molded integrally with the barrel 10.

In the above writing instrument P of a twin type, the ink is consumed at the respective pen tips 40, 45, and a sign of exhausting the ink in the ink occlusion body 20 is detected by visually observing the ink guiding feed 30 via a visible part 12.

The visible part 12, the ink guiding feed 30 and the like are provided at the pen tip 40 side in the embodiment described above. On the contrary, it is allowed that the visible part 12, the ink guiding feed 30 and the like are provided at the pen tip 45 side and that a rear end part of the pen tip 40 is inserted into and brought into contact with the ink occlusion body 20, whereby the ink is fed directly from the ink occlusion body 20.

It is a matter of course that the writing instrument of the present invention shall not be restricted to the respective embodiments 1 to 14 described above and that it can be modified to various forms as long as the scope of the present invention is not changed.

For example, the respective embodiments of the first embodiment (including the variant example shown in FIG. 4) to the fourteenth embodiment each described above may suitably be combined; for example, the third or fourth embodiment may be applied to the writing instrument of the fifth or sixth embodiment; the second to fourth embodiments may be applied respectively to the writing instrument of the seventh embodiment; further, the writing instrument G of the seventh embodiment may be provided with an inter-feeder; and in the respective writing instruments A to G of the respective embodiments of the first to seventh embodiments, a pen tip feeder for efficiently feeding the ink contained in the ink guiding feed 30 to the pen tip 40 may be further added separately or integrally with the pen tip.

Further, the respective embodiments of the eighth embodiment (including the variant example shown in FIG. 12) to the thirteenth embodiment each described above may suitably be combined; for example, the tenth or eleventh embodiment may be applied to the writing instruments of the twelfth, thirteenth and fourteenth embodiments; and in the respective writing instruments H to P of the tenth to fourteenth embodiments, a pen tip feeder for efficiently feeding the ink contained in the ink guiding feed 30 to the pen tip 40 may be further added separately or integrally with the pen tip.

The writing instrument of the present invention has a structure as a scope, in which the ink impregnated into the ink occlusion body 20 is fed to the pen tip via the ink guiding feed 30 having visibility or the inter-feeder 25 and the ink guiding feed 30 having visibility and in which a sign of exhausting the ink fed from the ink occlusion body 20 can be detected by visually observing the ink guiding feed 30 described above via the visible part 12 formed in the barrel 10. Accordingly, a structure in which the above scope is not changed shall not specifically be restricted, and various structures publicly known for writing instruments can be adopted. The present invention can suitably be applied to writing instruments of various uses by changing the pen tip and the kind of the ink according to uses such as a ballpoint pen, a felt-tip pen, a marking pen, a writing brush pen and the like.

Further, the writing instrument may be applied for an applicator by using a correction liquid, a coating liquid, liquid toiletries such as cosmetics instead of the ink.

EXAMPLES

Next, the present invention shall more specifically be explained with reference to specific examples, but the present invention shall not be restricted to the following examples. A surface tension of an ink and the like was measured by a Wilhelmy method (CBVP-Z type, manufactured by Kyowa Interface Science Co., Ltd.), and a viscosity of an ink was measured by means of a rotational viscometer (TV-20L, manufactured by Tokimec Inc.).

Example 1

Felt-Tip Pen

A barrel, an ink occlusion body, an ink guiding feed, a pen tip and an ink composition each having the following constitutions were used to prepare a felt-tip pen according to FIG. 1 and FIG. 3.

(1) Barrel

Made of polypropylene, a diameter of a large diameter part: 10 mm, a length of a visible part: 15 mm (the part other than the visible part was a non-visible part by coloring it), an overall length: 120 mm (2) Ink Occlusion Body Constituted from a sliver made of polyethylene terephthalate (porosity: 80%), a diameter: 9 mm, a length: 60 mm (3) Ink Guiding Feed Made of PFA (tetrafluoroethylene-perfluoroalkyl vinyl ether copolymer), an inner diameter: 3 mm, a length: 20 mm, an ink passage cross-sectional area: about 7 mm$^2$, a surface tension (25° C.) of a material itself for the ink guiding feed: 20 mN/m, a length by which a rear end part was inserted into the ink occlusion body 20: 3 mm (4) Pen Tip Constituted from a sliver feed of an acryl fiber (porosity: 55%), a length: 15 mm

| (5) Ink composition (total amount: 100% by weight) | |
|---|---|
| Water soluble dye (C. I. Direct Black-154) | 4.5 |
| Water soluble dye (C. I. Direct Black-19) | 1.5 |
| Ethylene glycol | 10.0 |
| Glycerin | 10.0 |
| pH controlling agent | 0.3 |
| Preservative (Proxel GXL) | 0.5 |

-continued

| (5) Ink composition (total amount: 100% by weight) | |
|---|---|
| Adhesive resin (styrene acrylic acid resin, neutralized with ammonia) | 3.0 |
| Surfactant (Noigen p, manufactured by Daiichi Kogyo Seiyaku Co., Ltd.) | 0.2 |
| Refined water | balance |

A surface tension (25° C.) of the ink: 37 mN/m, a viscosity (25° C.) of the ink: 8 mPa·s, an amount of the ink impregnated into the ink occlusion body: 2.5 g.

In a felt-tip pen A obtained in the constitution described above, it could be visually observed via a visible part 12 that after assembling, an ink passed through an ink guiding feed 30, and then it was found that the ink penetrated into a pen tip 40 and that an ink discharge amount of the felt-tip pen was almost constant until the ink was exhausted as was the case with a free ink type writing instrument and good drawn lines could be written.

Writing was continued until the ink impregnated into an ink occlusion body 20 was exhausted to find that the ink run out from the ink guiding feed 30, that is, a sign of exhausting the ink fed from the ink occlusion body 20 could readily and surely be detected by visually observing the ink guiding feed 30 described above via the visible part 12 formed in a barrel 10.

Further, after detecting the exhaustion of the ink from the ink guiding feed 30, a discharge amount of the ink was suddenly decreased, and writing became impossible.

Example 2

Felt-Tip Pen

A barrel, an ink occlusion body, an ink guiding feed, a pen tip and an ink composition each having the following constitutions were used to prepare a felt-tip pen according to FIG. 5.
(1) Barrel
Made of polypropylene, a diameter of a large diameter part: 10 mm, a length of a visible part: 15 mm (the part other than the visible part was a non-visible part by coloring it), an overall length: 120 mm
(2) Ink Occlusion Body
Constituted from a sliver made of polyethylene terephthalate (porosity: 80%), a diameter: 9 mm, a length: 60 mm
(3) Two Ink Guiding Feeds Having Different Lengths
  i) Made of polypropylene, an inner diameter: 3 mm, a length: 20 mm, an ink passage cross-sectional area: about 7 mm², a surface tension (25° C.) of a material itself for the ink guiding feed: 31 mN/m, a length by which a rear end part was inserted into the ink occlusion body 20: 3 mm.
  ii) Made of polypropylene, an inner diameter: 3 mm, a length: 30 mm, an ink passage cross-sectional area: about 7 mm², a surface tension (25° C.) of a material itself for the ink guiding feed: 31 mN/m, a length by which a rear end part was inserted into the ink occlusion body 20: 3 mm.
  iii) X: 10 mm
(4) Pen Tip
Constituted from a sliver feed of a polyethylene terephthalate fiber (porosity: 55%), a length: 15 mm

| (5) Ink composition (total amount: 100% by weight) | |
|---|---|
| Water soluble dye (C. I. Direct Black-154) | 5.0 |
| Thiodiethanol | 10.0 |
| Glycerin | 5.0 |
| Urea | 4.0 |
| Surfactant (Dobanox 25N, manufactured by Lion Corporation) | 0.05 |
| Refined water | balance |

A surface tension (25° C.) of the ink: 55 mN/m, a viscosity (25° C.) of the ink: 2 mPa·s, an amount of the ink impregnated into the ink occlusion body: 2.5 g.

In a felt-tip pen B obtained in the constitution described above, it could be visually observed via a visible part 12 that after assembling, an ink passed through ink guiding feeds 31, 32, and then it was found that the ink penetrated into a pen tip 40 and that good drawn lines could be written as a felt-tip pen.

Writing was continued until the ink impregnated into the ink occlusion body 20 was exhausted to find that firstly, the ink run out from the ink guiding feed 31, that is, a sign of a remaining amount (90% in the present example) of the ink fed from the ink occlusion body 20 could readily and surely be detected by visually observing the ink guiding feed 30 described above via the visible part 12 formed in a barrel 10. Further, writing was continued to find that the ink was exhausted from the ink guiding feed 32, that is, a sign of exhausting the ink fed from the ink occlusion body 20 could readily and surely be detected by visually observing the ink guiding feed 32 described above via the visible part 12 formed in the barrel 10. The same evaluation results as in Example 1 were obtained for the others.

Example 3

Felt-Tip Pen

Figure 6:
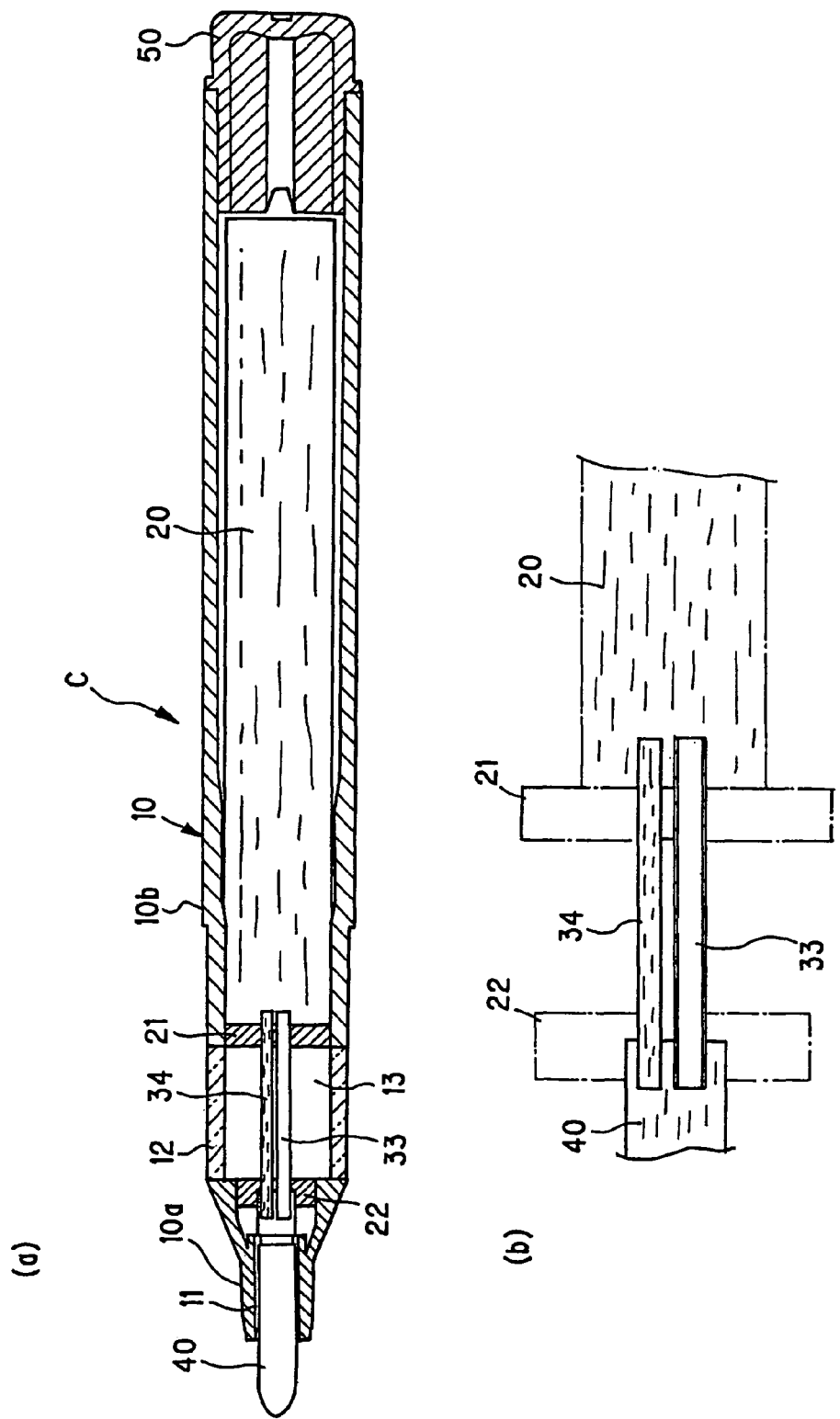
FIG. 6(a) is a partial longitudinal cross section of a writing instrument showing the third embodiment of the present invention, and (b) is a partial longitudinal cross section showing an essential part thereof.

A barrel, an ink occlusion body, an ink guiding feed, a pen tip and an ink composition each having the following constitutions were used to prepare a felt-tip pen according to FIG. 6.
(1) Barrel
Made of polypropylene, a diameter of a large diameter part: 10 mm, a length of a visible part: 15 mm (the part other than the visible part was a non-visible part by coloring it), an overall length: 120 mm
(2) Ink Occlusion Body
Constituted from a sliver made of polyethylene terephthalate (porosity: 80%), a diameter: 9 mm, a length: 60 mm
(3) Ink Guiding Feed
Made of polypropylene, an inner diameter: 3 mm, a length: 20 mm, an ink passage cross-sectional area: about 7 mm², a surface tension (25° C.) of a material itself for the ink guiding feed: 31 mN/m, a length by which a rear end part was inserted into the ink occlusion body 20: 3 mm
(4) Ink-Feeder
Constituted from a sliver made of polyethylene terephthalate (porosity: 50%), a diameter: 3 mm, a length: 20 mm
(5) Pen Tip
Constituted from a sliver feed of an acryl fiber (porosity: 55%), a length: 15 mm

| (6) Ink composition (total amount: 100% by weight) | |
|---|---|
| Carbon black | 6.0 |
| Thiodiethanol | 15.0 |
| Glycerin | 5.0 |

| (6) Ink composition (total amount: 100% by weight) | |
| --- | --- |
| Urea | 5.0 |
| Surfactant (Pluronic PE3100, manufactured by BASF AG.) | 0.03 |
| Refined water | balance |

A surface tension (25° C.) of the ink: 54 mN/m, a viscosity (25° C.) of the ink: 2.5 mPa·s, an amount of the ink impregnated into the ink occlusion body: 2.5 g.

In a felt-tip pen C obtained in the constitution described above, it could be visually observed via a visible part 12 that after assembling, an ink passed through an ink guiding feed 33, and then it was found that the ink penetrated into a pen tip 40 and that good drawn lines could be written as a felt-tip pen.

Writing was continued until the ink impregnated into the ink occlusion body 20 was exhausted to find that the ink run out from the ink guiding feed 33, that is, a sign of exhausting the ink fed from the ink occlusion body 20 could readily and surely be detected by visually observing the ink guiding feed 33 described above via the visible part 12 formed in a barrel 10. The same evaluation results as in Example 1 were obtained for the others.

Example 4

Felt-Tip Pen

A barrel, an ink occlusion body, an ink guiding feed, a pen tip and an ink composition each having the following constitutions were used to prepare a felt-tip pen according to FIG. 7.
(1) Barrel
  Made of polypropylene, a diameter of a large diameter part: 10 mm, a length of a visible part: 15 mm (the part other than the visible part was a non-visible part by coloring it), an overall length: 120 mm
(2) Ink Occlusion Body
  Constituted from a sliver made of polyethylene terephthalate (porosity: 80%), a diameter: 8 mm, a length: 60 mm
(3) Ink Guiding Feed
  Made of PFA (tetrafluoroethylene-perfluoroalkyl vinyl ether copolymer), an inner diameter: 3 mm, a length: 20 mm, an ink passage cross-sectional area: about 7 mm², a surface tension (25° C.) of a material itself for the ink guiding feed: 20 mN/m, a length by which a rear end part was inserted into the ink occlusion body 20: 3 mm.
(4) Bar-Like Body
  Made of Teflon (trade name), a diameter: 1 mm, a length: 25 mm, white
(5) Pen Tip
  Constituted from a sliver feed of an acryl fiber (porosity: 50%), a length: 15 mm

| (6) Ink composition (total amount: 100% by weight) | |
| --- | --- |
| Color pigment (C. I. Pigment Blue 15:3) | 4.0 |
| Thiodiethanol | 5.0 |
| Diethylene glycol | 5.0 |
| Isopropyl alcohol | 3.0 |
| Urea | 3.0 |
| Surfactant (Pluronic PE3100, manufactured by BASF AG.) | 0.03 |
| Refined water | balance |

A surface tension (25° C.) of the ink: 55 mN/m, a viscosity (25° C.) of the ink: 2 mPa·s, an amount of the ink impregnated into the ink occlusion body: 2.5 g.

In a felt-tip pen D obtained in the constitution described above, it could be visually observed via a visible part 12 that after assembling, an ink passed through an ink guiding feed 35, and then it was found that the ink penetrated into a pen tip 40 and that good drawn lines could be written as a felt-tip pen.

Writing was continued until the ink impregnated into the ink occlusion body 20 was exhausted to find that the ink run out from an ink guiding feed 30, that is, a sign of exhausting the ink fed from the ink occlusion body 20 could readily and surely be detected by visually observing a white color of the bar-like body inserted into the ink guiding feed 35 described above via the visible part 12 formed in a barrel 10. The same evaluation results as in Example 1 were obtained for the others.

Example 5

Ballpoint Pen

A barrel, an ink occlusion body, an ink guiding feed, a pen tip and an ink composition each having the following constitutions were used to prepare a ballpoint pen according to FIG. 9.
(1) Barrel
  Made of polypropylene, a diameter of a large diameter part: 8 mm, a length of a visible part: 15 mm (the part other than the visible part was a non-visible part by coloring it), an overall length: 120 mm
(2) Ink Occlusion
  Constituted from a sliver made of polyethylene terephthalate (porosity: 80%), a diameter: 6 mm, a length: 60 mm
(3) Ink Guiding Feed
  Made of polypropylene, an inner diameter: 3 mm, a length: 20 mm, an ink passage cross-sectional area: about 7 mm², a surface tension (25° C.) of a material itself for the ink guiding feed: 31 mN/m, a length by which a rear 20 end part was inserted into an ink occlusion body 20: 3 mm
(4) Pen Tip
  Constituted from a sliver feed of an acryl fiber (porosity: 50%), a length: 15 mm, a ball diameter: 0.5 mm

| (5) Ink composition (total amount: 100% by weight) | |
| --- | --- |
| Water soluble dye (C. I. Direct Black-154) | 5.0 |
| Thiodiethanol | 10.0 |
| Glycerin | 5.0 |
| Urea | 4.0 |
| Surfactant (Dobanox 25N, manufactured by Lion Corporation) | 0.05 |
| Refined water | balance |

A surface tension (25° C.) of the ink: 55 mN/m, a viscosity (25° C.) of the ink: 2 mPa·s, an amount of the ink impregnated into the ink occlusion body: 2.5 g.

In a ballpoint pen E obtained in the constitution described above, it could be visually observed via a visible part 12 that after assembling, an ink passed through ink guiding feed 30, and then it was found that the ink penetrated into a pen tip 40 and that good drawn lines could be written as a ballpoint pen.

Writing was continued until the ink impregnated into the ink occlusion body 20 was exhausted to find that the ink run out from an ink guiding feed 30, that is, a sign of exhausting the ink fed from the ink occlusion body 20 could readily and surely be detected by visually observing the ink guiding feed 30 described above via the visible part 12 formed in a barrel 10. The same evaluation results as in Example 1 were obtained for the others.

Example 6

Felt-Tip Pen

In Example 1 described above, two elements of the ink occlusion body and the ink composition were changed to an ink occlusion body and an ink composition (oil-based ink) having the following constitutions to prepare a felt-tip pen according to FIG. 1 and FIG. 3.
(1) Ink Occlusion Body:
Constituted from a sliver made of polypropylene (porosity: 80%), a diameter: 9 mm, a length: 60 mm

| (2) Ink composition (total amount: 100% by weight) | |
|---|---|
| n-Propyl alcohol | 75.0 |
| Laropal A-101 (condensation product of aldehyde and urea, manufactured by BASE AG.) | 7.5 |
| Alresat KM400 (maleic acid resin, manufactured by Hoechst AG.) | 10.0 |
| Victoria Blue BSA (dye, manufactured by Zeneca Co., Ltd.) | 2.5 |
| Rhodamine 6JHSA (dye, manufactured by Zeneca Co., Ltd.) | 2.5 |
| Flex YELLOW 105 (dye, manufactured by Zeneca Co., Ltd.) | 2.5 |

A surface tension (25° C.) of the ink: about 22 mN/m, a viscosity (25° C.) of the ink: about 4 mPa·s, an amount of the ink impregnated into the ink occlusion body: 2.5 g.

In a felt-tip pen A obtained in the constitution described above, it could be visually observed via a visible part 12 that after assembling, an ink passed through an ink guiding feed 30, and then it was found that the ink penetrated into a pen tip 40 and that an ink discharge amount of the felt-tip pen was almost constant until the ink was exhausted as was the case with a free ink type writing instrument and good drawn lines could be written.

Writing was continued until the oil-based ink impregnated into an ink occlusion body 20 was exhausted to find that the oil-based ink run out from the ink guiding feed 30, that is, a sign of exhausting the ink fed from the ink occlusion body 20 could readily and surely be detected by visually observing the ink guiding feed 30 described above via the visible part 12 formed in a barrel 10.

Further, after detecting the exhaustion of the ink from the ink guiding feed 30, a discharge amount of the ink was suddenly decreased, and writing became impossible.

Example 7

Felt-Tip Pen

A barrel, an ink occlusion body, an ink guiding feed, an inter-feeder, a pen tip and an ink composition each having the following constitutions were used to prepare a felt-tip pen according to FIG. 11.
(1) Barrel
Made of polypropylene, a diameter of a large diameter part: 10 mm, a length of a visible part: 15 mm (the part other than the visible part was a non-visible part by coloring it), an overall length: 120 mm (2) Ink Occlusion Body
Constituted from a sliver made of polyethylene terephthalate (porosity: 80%), a diameter: 9 mm, a length: 60 mm
(3) Ink Guiding Feed
Made of PFA (tetrafluoroethylene-perfluoroalkyl vinyl ether copolymer), an inner diameter: 3 mm, a length: 20 mm, an ink passage cross-sectional area: about 7 mm$^2$, a surface tension (25° C.) of a material itself for the ink guiding feed: 20 mN/m, a length by which a rear end part was inserted into the ink occlusion body 20: 3 mm
(4) Inter-Feeder
Constituted from a sliver made of acryl (porosity: 55%), a diameter: about 3 mm, a length: 20 mm, a form of an inserted part: cylindrical, a form of acute angle part: conical
(5) Pen Tip
Constituted from a sliver feed of an acryl fiber (porosity: 50%), a length: 15 mm

| (5) Ink composition (total amount: 100% by weight) | |
|---|---|
| Water soluble dye (C. I. Direct Black-154) | 4.5 |
| Water soluble dye (C. I. Direct Black-19) | 1.5 |
| Ethylene glycol | 10.0 |
| Glycerin | 10.0 |
| pH controlling agent | 0.3 |
| Preservative (Proxel GXL) | 0.5 |
| Adhesive resin (styrene acrylic acid resin, neutralized with ammonia) | 3.0 |
| Surfactant (Noigen p, manufactured by Daiichi Kogyo Seiyaku Co., Ltd.) | 0.2 |
| Refined water | balance |

A surface tension (25° C.) of the ink: 37 mN/m, a viscosity (25° C.) of the ink: 8 mPa·s, an amount of the ink impregnated into the ink occlusion body: 2.5 g.

In a felt-tip pen obtained in the constitution described above, it could be visually observed via a visible part 12 that after assembling, an ink passed through an ink guiding feed 30, and then it was found that the ink penetrated into a pen tip 40 and that an ink discharge amount of the felt-tip pen was almost constant until the ink was exhausted as was the case with a free ink type writing instrument and good drawn lines could be written.

Writing was continued until the ink impregnated into the ink occlusion body 20 was exhausted to find that the ink run out from the ink guiding feed 30, that is, a sign of exhausting the ink fed from the ink occlusion body 20 could readily and surely be detected by visually observing the ink guiding feed 30 described above via the visible part 12 formed in a barrel 10.

Further, after detecting the exhaustion of the ink from the ink guiding feed 30, a discharge amount of the ink was suddenly decreased, and writing became impossible.

Example 8

Felt-Tip Pen

A barrel, an ink occlusion body, an ink guiding feed, an inter-feeder, a pen tip feed, a pen tip and an ink composition each having the following constitutions were used to prepare a felt-tip pen according to FIG. 13.
(1) Barrel
Made of polypropylene, a diameter of a large diameter part: 10 mm, a length of a visible part: 15 mm (the part other than the visible part was a non-visible part by coloring it), an overall length: 120 mm (2) Ink Occlusion Body Constituted from a sliver made of polyethylene terephthalate (porosity: 80%), a diameter: 9 mm, a length: 60 mm (3) Ink Guiding Feed Made of polypropylene, an inner diameter: 3 mm, a length: 20 mm, an ink passage cross-sectional area: about 7 mm², a surface tension (25° C.) of a material itself for the ink guiding feed: 31 mN/m, a length by which a rear end part was inserted into an ink occlusion body 20: 3 mm (4) Inter-Feeder Constituted from a sliver made of acryl (porosity: 55%), a diameter: about 3 mm, a length: 30 mm, a form of an inserted part: cylindrical, a form of acute angle part: conical (5) Pen Tip Feeder Constituted from a sliver made of acryl (porosity: 50%), a diameter: about 3 mm, a length: 8 mm, a form of an inserted part: cylindrical, a form of acute angle part: conical, a length: 15 mm (6) Pen Tip Constituted from a sliver feed of polyethylene terephthalate (porosity: 50%), a length: 15 mm

| (7) Ink composition (total amount: 100% by weight) | |
|---|---|
| Water soluble dye (C. I. Direct Black-154) | 5.0 |
| Thiodiethanol | 10.0 |
| Glycerin | 5.0 |
| Urea | 4.0 |
| Surfactant (Dobanox 25N, manufactured by Lion Corporation) | 0.05 |
| Refined water | balance |

A surface tension (25° C.) of the ink: 55 mN/m, a viscosity (25° C.) of the ink: 2 mPa·s, an amount of the ink impregnated into the ink occlusion body: 2.5 g.

In a felt-tip pen obtained in the constitution described above, it could be visually observed via a visible part 12 that after assembling, an ink passed through an ink guiding feed 30, and then it was found that the ink penetrated into a pen tip 40 via a pen tip feeder 28 and that an ink discharge amount of the felt-tip pen was almost constant until the ink was exhausted as was the case with a free ink type writing instrument and good drawn lines could be written.

Writing was continued until the ink impregnated into the ink occlusion body 20 was exhausted to find that the ink run out from the ink guiding feed 30, that is, a sign of exhausting the ink fed from the ink occlusion body 20 could readily and surely be detected by visually observing the ink guiding feed 30 described above via the visible part 12 formed in a barrel 10.

Further, after detecting the exhaustion of the ink from the ink guiding feed 30, a discharge amount of the ink was suddenly decreased, and writing became impossible.

Example 9

Felt-Tip Pen

A barrel, an ink occlusion body, an ink guiding feed, inter-feeders, a pen tip and an ink composition each having the following constitutions were used to prepare a felt-tip pen according to FIG. 14.

(1) Barrel

Made of polypropylene, a diameter of a large diameter part: 10 mm, a length of a visible part: 15 mm (the part other than the visible part was a non-visible part by coloring it), an overall length: 120 mm (2) Ink Occlusion Body Constituted from a sliver made of polyethylene terephthalate (porosity: 80%), a diameter: 9 mm, a length: 60 mm (3) Ink Guiding Feeds i) Long ink guiding feed: made of polypropylene, an inner diameter: 3 mm, a length: 35 mm, an ink passage cross-sectional area: about 7 mm², a surface tension (25° C.) of a material itself for the ink guiding feed: 31 mN/m, a length by which a rear end part was inserted into an ink occlusion body 20: 15 mm.

ii) Short ink guiding feed: made of polypropylene, an inner diameter: 3 mm, a length: 25 mm, an ink passage cross-sectional area: about 7 mm², a surface tension (25° C.) of a material itself for the ink guiding feed: 31 mN/m, a length by which a rear end part was inserted into the ink occlusion body 20: 5 mm.

(4) Inter-Feeder i) Long feeder: constituted from a sliver made of polyethylene terephthalate (porosity: 55%), a diameter: 3 mm, a length: 20 mm, a form: cylindrical ii) Short feeder: constituted from a sliver made of polyethylene terephthalate (porosity: 55%), a diameter: 3 mm, a length: 10 mm, a form: cylindrical iii) $X_1$: 10 mm, $X_2$: 15 mm (5) Pen Tip Constituted from a sliver feed of an acryl fiber (porosity: 50%), a length: 15 mm

| (6) Ink composition (total amount: 100% by weight) | |
|---|---|
| Carbon black | 6.0 |
| Thiodiethanol | 15.0 |
| Glycerin | 5.0 |
| Urea | 5.0 |
| Surfactant (Pluronic PE3100, manufactured by BASF AG.) | 0.03 |
| Refined water | balance |

A surface tension (25° C.) of the ink: 54 mN/m, a viscosity (25° C.) of the ink: 2.5 mPa·s, an amount of the ink impregnated into the ink occlusion body: 2.5 g.

In a felt-tip pen obtained in the constitution described above, it could be visually observed via a visible part 12 that after assembling, an ink passed through ink guiding feeds 31, 32, and then it was found that the ink penetrated into a pen tip 40 and that good drawn lines could be written as a felt-tip pen.

Writing was continued until the ink impregnated into the ink occlusion body 20 was exhausted to find that firstly, the ink run out from the ink guiding feed 31, that is, a sign of a remaining amount (70% in the present example) of the ink fed from the ink occlusion body 20 could readily and surely be detected by visually observing the ink guiding feed 31 described above via the visible part 12 formed in a barrel 10. Further, writing was continued to find that the ink run out from the ink guiding feed 32, that is, a sign of exhausting the ink fed from the ink occlusion body 20 could readily and surely be detected by visually observing the ink guiding feed 32 described above via the visible part 12 formed in the barrel 10. The same evaluation results as in Example 1 were obtained for the others.

Example 10

Felt-Tip Pen

A barrel, an ink occlusion body, an ink guiding feed, an inter-feeder, a pen-tip, a bar-like body and an ink composition each having the following constitutions were used to prepare a felt-tip pen according to FIG. 15.

(1) Barrel

Made of polypropylene, a diameter of a large diameter part: 10 mm, a length of a visible part: 15 mm (the part other than the visible part was a non-visible part by coloring it), an overall length: 120 mm (2) Ink Occlusion Body Constituted from a sliver made of polyethylene terephthalate (porosity: 80%), a diameter: 8 mm, a length: 60 mm (3) Inter-Feeder Constituted from a sliver made of acryl (porosity: 55%), a diameter: about 3 mm, a length: 30 mm, a form of an inserted part: cylindrical, a form of acute angle part: conical (4) Ink Guiding Feed Made of PFA (tetrafluoroethylene-perfluoroalkyl vinyl ether copolymer), an inner diameter: 3 mm, a length: 20 mm, an ink passage cross-sectional area: about 7 mm$^2$, a surface tension (25° C.) of a material itself for the ink guiding feed: 20 mN/m, a length by which a rear end part was inserted into the ink occlusion body 20: 3 mm (5) Bar-Like Body Made of Teflon (trade name), a diameter: 1 mm, a length: 25 mm, white (6) Pen Tip Constituted from a sliver feed of an acryl fiber (porosity: 50%), a length: 15 mm

| (7) Ink composition (total amount: 100% by weight) | |
|---|---|
| Color pigment (C. I. Pigment Blue 15:3) | 4.0 |
| Thiodiethanol | 5.0 |
| Diethylene glycol | 5.0 |
| Isopropyl alcohol | 3.0 |
| Urea | 3.0 |
| Surfactant (Pluronic PE3100, manufactured by BASF AG.) | 0.03 |
| Refined water | balance |

A surface tension (25° C.) of the ink: 55 mN/m, a viscosity (25° C.) of the ink: 2 mPa·s, an amount of the ink impregnated into the ink occlusion body: 2.5 g.

In a felt-tip pen obtained in the constitution described above, it could be visually observed via a visible part 12 that after assembling, an ink passed through an ink guiding feed 35, and then it was found that the ink penetrated into a pen tip 40 and that good drawn lines could be written as a felt-tip pen.

Writing was continued until the ink impregnated into the ink occlusion body 20 was exhausted to find that the ink run out from an ink guiding feed 30, that is, a sign of exhausting the ink fed from the ink occlusion body 20 could readily and surely be detected by visually observing a white color of the bar-like body inserted into the ink guiding feed 35 described above via the visible part 12 formed in a barrel 10. The same evaluation results as in Example 1 were obtained for the others.

Example 11

Ballpoint Pen

A barrel, an ink occlusion body, an ink guiding feed, an inter-feeder, a pen tip and an ink composition each having the following constitutions were used to prepare a felt-tip pen according to FIG. 17.

(1) Barrel

Made of polypropylene, a diameter of a large diameter part: 8 mm, a length of a visible part: 15 mm (the part other than the visible part was a non-visible part by coloring it), an overall length: 120 mm (2) Ink Occlusion Body Constituted from a sliver made of polyethylene terephthalate (porosity: 80%), a diameter: 6 mm, a length: 60 mm (3) Inter-Feeder Constituted from a sliver made of polyethylene terephthalate (porosity: 55%), a diameter: 3 mm, a length: 20 mm, a form of an inserted part: cylindrical, a form of an acute angle part: conical (4) Ink Guiding Feed Made of polypropylene, an inner diameter: 3 mm, a length: 20 mm, an ink passage cross-sectional area: about 7 mm$^2$, a surface tension (25° C.) of a material itself for the ink guiding feed: 31 mN/m, a length by which a rear end part was inserted into an ink occlusion body 20: 3 mm (5) Pen Tip Made of stainless steel, a length: 10 mm, a ball diameter: 0.5 mm

| (6) Ink composition (total amount: 100% by weight) | |
|---|---|
| Water soluble dye (C. I. Direct Black-154) | 5.0 |
| Thiodiethanol | 10.0 |
| Glycerin | 5.0 |
| Urea | 4.0 |
| Surfactant (Dobanox 25N, manufactured by Lion Corporation) | 0.05 |
| Refined water | balance |

A surface tension (25° C.) of the ink: 55 mN/m, a viscosity (25° C.) of the ink: 2 mPa·s, an amount of the ink impregnated into the ink occlusion body: 2.5 g.

In a ballpoint pen obtained in the constitution described above, it could be visually observed via a visible part 12 that after assembling, an ink passed through an ink guiding feed 30, and then it was found that the ink penetrated into a pen tip 40 and that good drawn lines could be written as a ballpoint pen.

Writing was continued until the ink impregnated into the ink occlusion body 20 was exhausted to find that the ink run out from the ink guiding feed 30, that is, a sign of exhausting the ink fed from the ink occlusion body 20 could readily and surely be detected by visually observing the ink guiding feed 30 described above via the visible part 12 formed in a barrel 10. The same evaluation results as in Example 1 were obtained for the others.

Example 12

Felt-Tip Pen

In Example 7 described above, two elements of the ink occlusion body and the ink composition were changed to an ink occlusion body and an ink composition (oil-based ink) having the following constitutions to prepare a felt-tip pen according to FIG. 11.

(1) Ink Occlusion Body:

Constituted from a sliver made of polyethylene terephthalate (porosity: 80%), a diameter: 9 mm, a length: 60 mm

| (2) Ink compostion (total amount: 100% by weight) | |
|---|---|
| n-Propyl alcohol | 75.0 |
| Laropal A-101 (condensation product of aldehyde and urea, manufactured by BASF AG.) | 7.5 |
| Alresat KM400 (maleic acid resin, manufactured by Hoechst AG.) | 10.0 |
| Victoria Blue BSA (dye, manufactured by Zeneca Co., Ltd.) | 2.5 |
| Rhodamine 6JHSA (dye, manufactured by Zeneca Co., Ltd.) | 2.5 |
| Flex YELLOW 105 (dye, manufactured by Zeneca Co., Ltd.) | 2.5 |

A surface tension (25° C.) of the ink: about 22 mN/m, a viscosity (25° C.) of the ink: about 4 mPa·s, an amount of the ink impregnated into the ink occlusion body: 2.5 g.

In a felt-tip pen obtained in the constitution described above, it could be visually observed via a visible part 12 that after assembling, an ink passed through an ink guiding feed 30, and then it was found that the ink penetrated into a pen tip 40 and that an ink discharge amount of the felt-tip pen was almost constant until the ink was exhausted as was the case with a free ink type writing instrument and good drawn lines could be written.

Writing was continued until the oil-based ink impregnated into an ink occlusion body 20 was exhausted to find that the ink run out from the ink guiding feed 30, that is, a sign of exhausting the ink fed from the ink occlusion body 20 could readily and surely be detected by visually observing the ink guiding feed 30 described above via the visible part 12 formed in a barrel 10.

Further, after detecting the exhaustion of the ink from the ink guiding feed 30, a discharge amount of the ink was suddenly decreased, and writing became impossible.

INDUSTRIAL APPLICABILITY

According to the present invention, provided is a writing instrument in which an ink impregnated into an ink occlusion body in a barrel is fed to a pen tip in a writing part, wherein a sign of exhausting the ink can readily and surely be detected by a simple structure; an ink discharge amount is almost constant until the ink is exhausted as is the case with a free ink type writing instrument, and good drawn lines can be written.

Further, in a writing instrument in which an ink impregnated into an ink occlusion body is fed to an ink guiding feed via an inter-feeder, provided is a writing instrument in which an ink impregnated into an ink occlusion body can more efficiently and smoothly be introduced into an ink guiding feed.

The invention claimed is:

1. A writing instrument comprising:
a barrel including a visible part;
an ink occlusion body disposed in said barrel, the ink occlusion body including a capillary material impregnated with ink;
a pen tip including a capillary material disposed in a writing part of the writing instrument, and
an ink guiding feed, wherein the ink impregnated in the ink occlusion body is fed to the pen tip via said ink guiding feed, a rear end part of said ink guiding feed joining to said ink occlusion body, and a front end part of said ink guiding feed joining to said pen tip;
wherein said visible part of said barrel is defined generally between said ink occlusion body and said pen tip, said ink guiding feed being held within said visible part;
wherein ink flows from the capillary material of said occlusion body by virtue of capillary force and ink flows into the capillary material of said pen tip by virtue of capillary force, said ink guiding feed lacking any capillary material therewithin;
wherein said ink guiding feed is tubular and has a cross-sectional area of 0.5 to 20 mm², and said ink guiding feed is disposed within the barrel between the ink occlusion body and the pen tip so as to prevent outside air from flowing in when the ink occlusion body is impregnated with ink, and allowing outside air to flow into the barrel as ink in the ink occlusion body is depleted; and
wherein said ink guiding feed has visibility such that a sign of exhausting the ink fed from the ink occlusion body to the pen tip is detected by visually observing the empty ink guiding feed via said visible part formed in the barrel.

2. The writing instrument as described in claim 1, wherein the ink impregnated into the ink occlusion body is fed to the ink guiding feed having visibility via an inter-feeder.

3. The writing instrument as described in claim 2, wherein the inter-feeder is brought into contact with the inside of the ink occlusion body in a length of 5% or more based on an overall length of the ink occlusion body.

4. The writing instrument as described in claim 2, wherein the inter-feeder has a cross-sectional area of 1 to 90% based on a cross-sectional area of the ink occlusion body.

5. The writing instrument as described in claim 2, wherein the inter-feeder has larger capillary force than that of the ink occlusion body.

6. The writing instrument as described in claim 2, wherein the inter-feeder has a cross-section structure comprising an inner layer and an outer layer, and the outer layer has larger capillary force than that of the inner layer.

7. The writing instrument as described in claim 2, wherein the ink fed to the ink guiding feed having visibility via the inter-feeder is fed to the pen tip further via a pen tip feeder.

8. The writing instrument as described in claim 2, wherein the inter-feeder comprises any one of a fiber bundle feed, porous sintered body of resin particles and a sliver feed, and a passage cross-sectional area for an ink flowing through the ink guiding feed can substantially be controlled by providing the inter-feeder with continuous passages while maintaining an apparent cross-sectional area of the ink guiding feed.

9. The writing instrument as described in claim 1, wherein a surface of the ink guiding feed which is brought into contact with the ink is formed of a material or the ink guiding feed itself is formed of a material having a smaller surface tension than that of the ink.

10. The writing instrument as described in claim 1, wherein the occlusion body has a distribution in capillary force such that it is increased toward a pen tip side.

11. The writing instrument as described in claim 1, wherein an inner diameter of the barrel is narrower toward the pen tip side.

12. The writing instrument as described in claim 1, wherein plural ribs are formed in an axial direction on an inner wall of the pen tip side of the barrel.

13. The writing instrument as described in claim 1, wherein a plurality of the ink guiding feeds having visibility is provided.

14. The writing instrument as described in claim 1, wherein the ink impregnated into the ink occlusion body is fed to the pen tip through an ink-feeder in addition to the ink guiding feed having visibility.

15. The writing instrument as described in claim 1, wherein a passage cross-sectional area for the ink flowing through the ink guiding feed and flow resistance of the ink can substantially be controlled by filling the ink guiding feed having visibility with a fiber bundle feed or a porous sintered body of resin particles which has a smaller surface tension than that of the ink and has a color which is different from that of the ink while maintaining an apparent cross-sectional area of the ink guiding feed.

16. The writing instrument as described in claim 1, wherein the visible part in the barrel has a length of 1 mm or more and not longer than an overall length of the writing instrument.

17. The writing instrument as described in claim 1, wherein the ink has a surface tension of 18 mN/or more at 25° C.

18. The writing instrument as described in claim 1, wherein the ink has a viscosity of 500 mPa·s or less at 25° C.

* * * * *